(12) United States Patent
Ohno et al.

(10) Patent No.: US 10,434,980 B2
(45) Date of Patent: Oct. 8, 2019

(54) VEHICLE SEAT BELT SYSTEM

(71) Applicant: TOYOTA JIDOSHA KABUSHIKI KAISHA, Toyota-shi, Aichi-ken (JP)

(72) Inventors: Mitsuyoshi Ohno, Miyoshi (JP); Makoto Sekizuka, Toyota (JP); Shigekazu Imanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/032,976

(22) Filed: Jul. 11, 2018

(65) Prior Publication Data

US 2019/0071054 A1   Mar. 7, 2019

(30) Foreign Application Priority Data

Sep. 5, 2017   (JP) .................................. 2017-170559

(51) Int. Cl.
*B60R 22/48* (2006.01)
*B60R 22/19* (2006.01)
(Continued)

(52) U.S. Cl.
CPC .............. *B60R 22/48* (2013.01); *B60R 22/18* (2013.01); *B60R 22/19* (2013.01); *B60R 22/1952* (2013.01); *B60R 21/01544* (2014.10); *B60R 2022/1806* (2013.01); *B60R 2022/4841* (2013.01); *B60R 2022/4866* (2013.01)

(58) Field of Classification Search
CPC ..... B60R 22/48; B60R 22/19; B60R 22/1952; B60R 21/01544; B60R 2022/1806; B60R 2022/4841; B60R 2022/4866; B60R 22/18
See application file for complete search history.

(56) References Cited

U.S. PATENT DOCUMENTS 4,457,251 A * 7/1984 Weman .............. A44B 11/2561
                                                116/203
4,979,400 A * 12/1990 Bartholomew .......... G01D 1/00
                                                116/203
(Continued)

FOREIGN PATENT DOCUMENTS

JP   H04-014290 Y2   3/1992
JP   H08-324374 A    12/1996
(Continued)

*Primary Examiner* — Brian A Zimmerman
*Assistant Examiner* — Sara B Samson
(74) *Attorney, Agent, or Firm* — Oliff PLC

(57) ABSTRACT

There is provided a vehicle seat belt system including: webbing that has one end anchored to one seat width direction side surface of a vehicle seat or to a vehicle body, and that restrains an occupant seated in the vehicle seat; a retractor to which another end of the webbing is engaged and that is configured to take up the webbing, the retractor being provided with a pretensioner which, when activated, pulls in the webbing; a buckle, with which a tongue plate attached to the webbing can be engaged; a force limiter that allows the buckle to move to thereby reduce a tensile load acting on the webbing due to activation of the pretensioner; and a warning section that is configured to utilize movement of the buckle resulting from the force limiter to notify the occupant of an abnormality that the force limiter has been activated.

15 Claims, 13 Drawing Sheets

(51) Int. Cl.
  *B60R 22/195*  (2006.01)
  *B60R 22/18*   (2006.01)
  *B60R 21/015*  (2006.01)

(56) References Cited

U.S. PATENT DOCUMENTS

| | | | |
|---|---|---|---|
| 5,660,347 A * | 8/1997 | Baker | B60R 22/195 |
| | | | 116/28 R |
| 5,752,716 A | 5/1998 | Fukawatase et al. | |
| 6,260,782 B1 * | 7/2001 | Smithson | B60R 22/341 |
| | | | 242/376 |
| 9,358,953 B2 * | 6/2016 | Cuddihy | B60R 22/03 |
| 2001/0002816 A1 * | 6/2001 | Yano | B60R 22/48 |
| | | | 340/457.1 |
| 2002/0113425 A1 | 8/2002 | Betz et al. | |
| 2003/0111835 A1 * | 6/2003 | Sullivan | B60R 22/48 |
| | | | 280/801.1 |
| 2006/0118347 A1 * | 6/2006 | Zelmer | B60R 22/03 |
| | | | 180/268 |
| 2018/0319361 A1 * | 11/2018 | Faruque | B60R 22/28 |

FOREIGN PATENT DOCUMENTS

| | | |
|---|---|---|
| JP | H10-100860 A | 4/1998 |
| JP | 2001-322531 A | 11/2001 |
| JP | 2002-308047 A | 10/2002 |
| JP | 2003-200813 A | 7/2003 |
| JP | 2013-018460 A | 1/2013 |

* cited by examiner

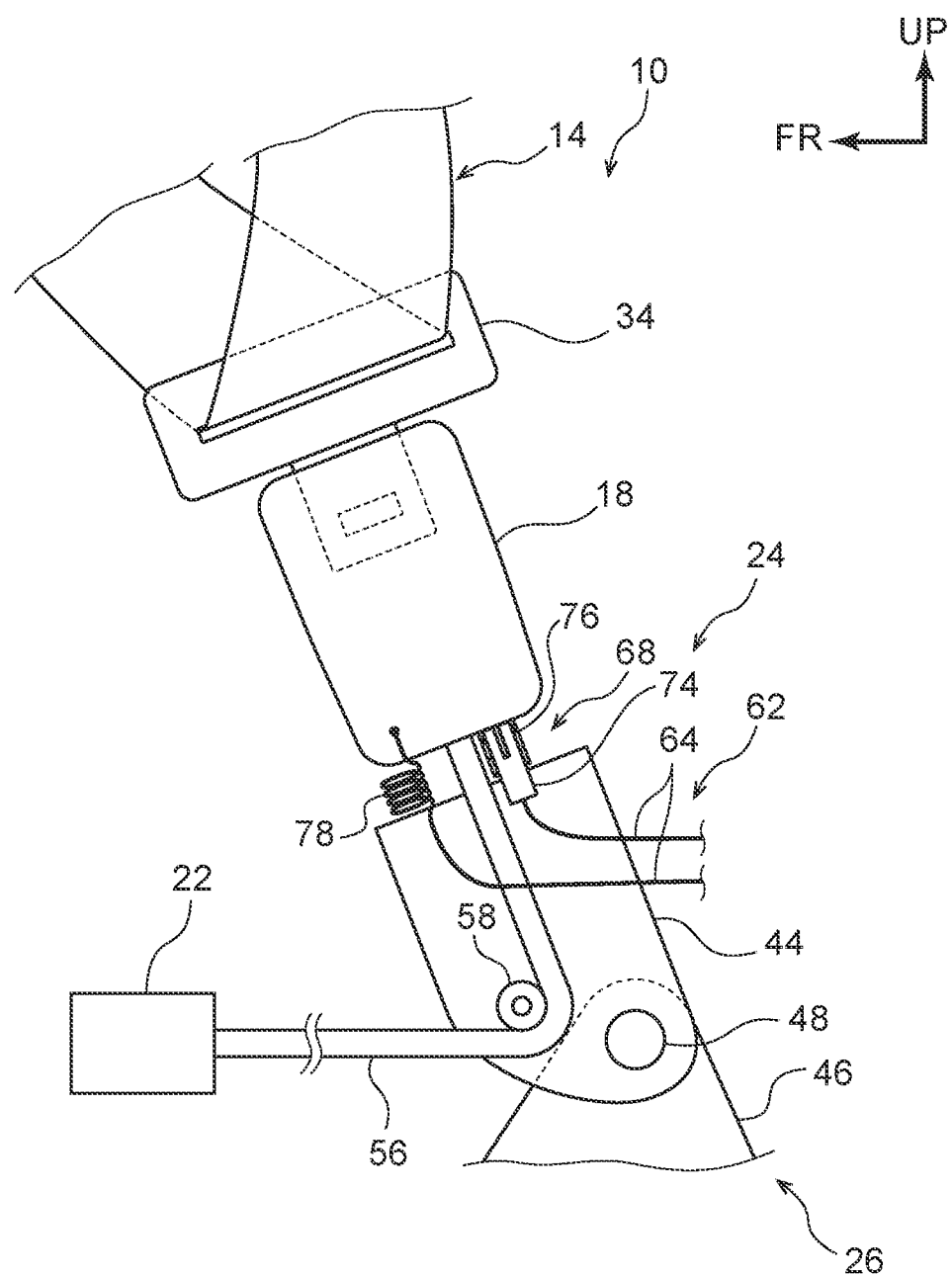

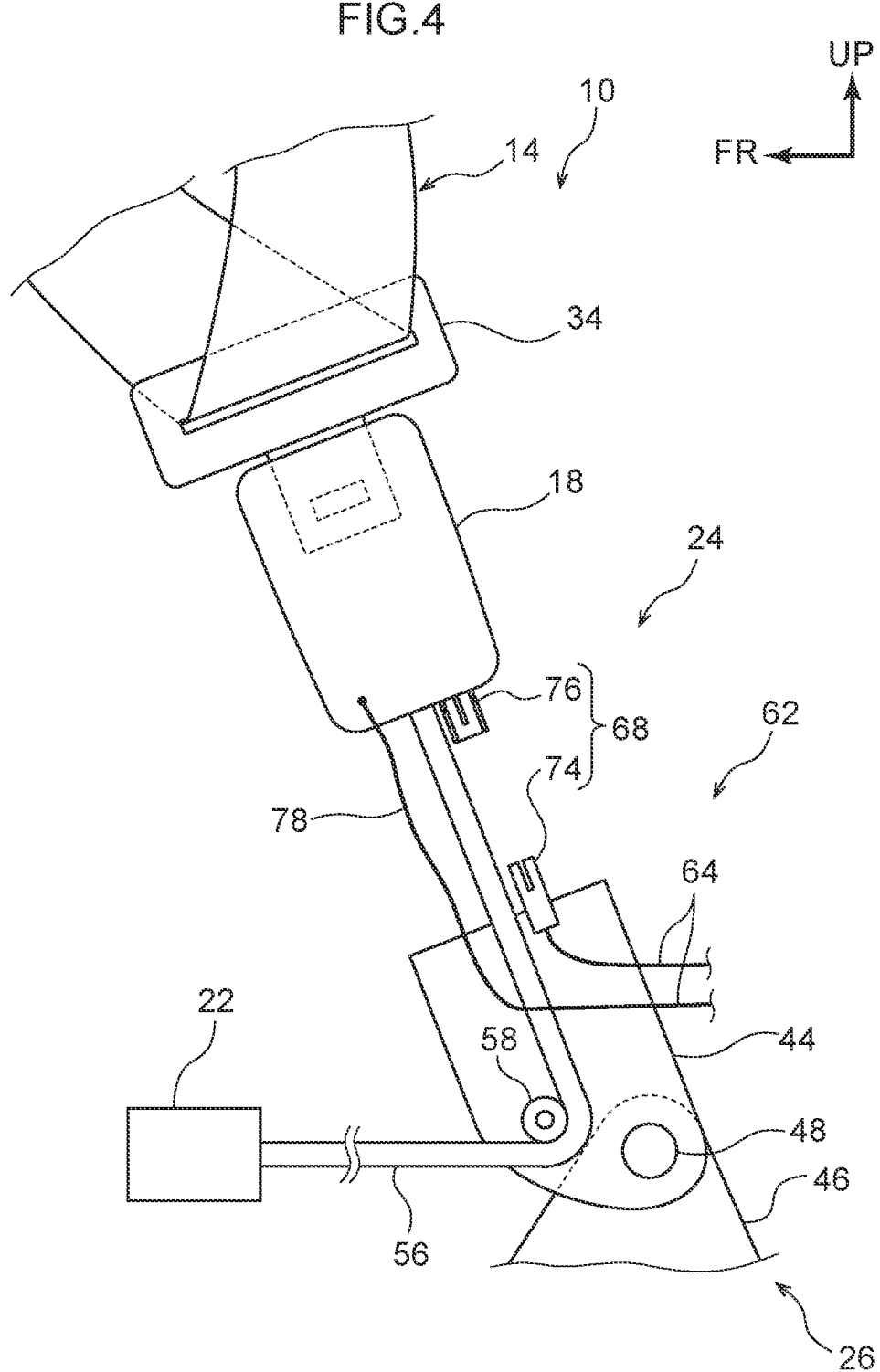

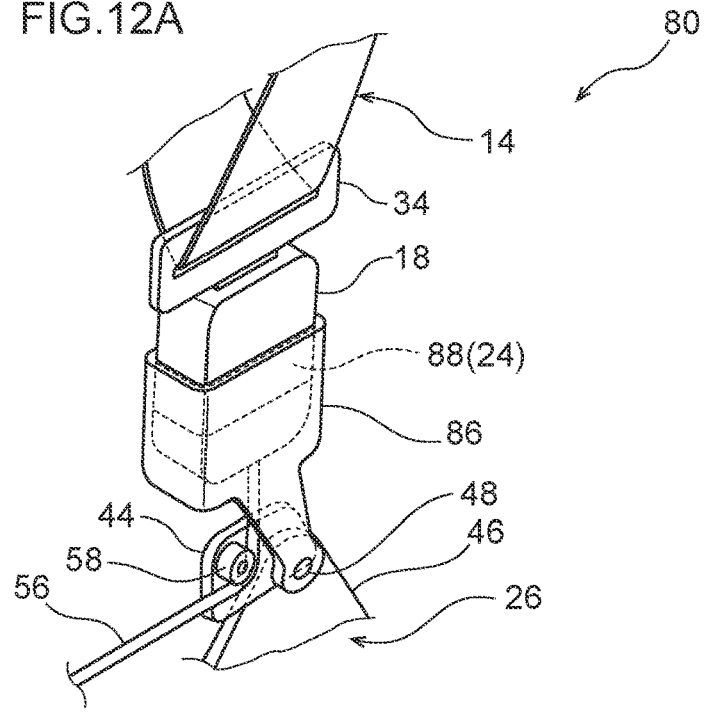
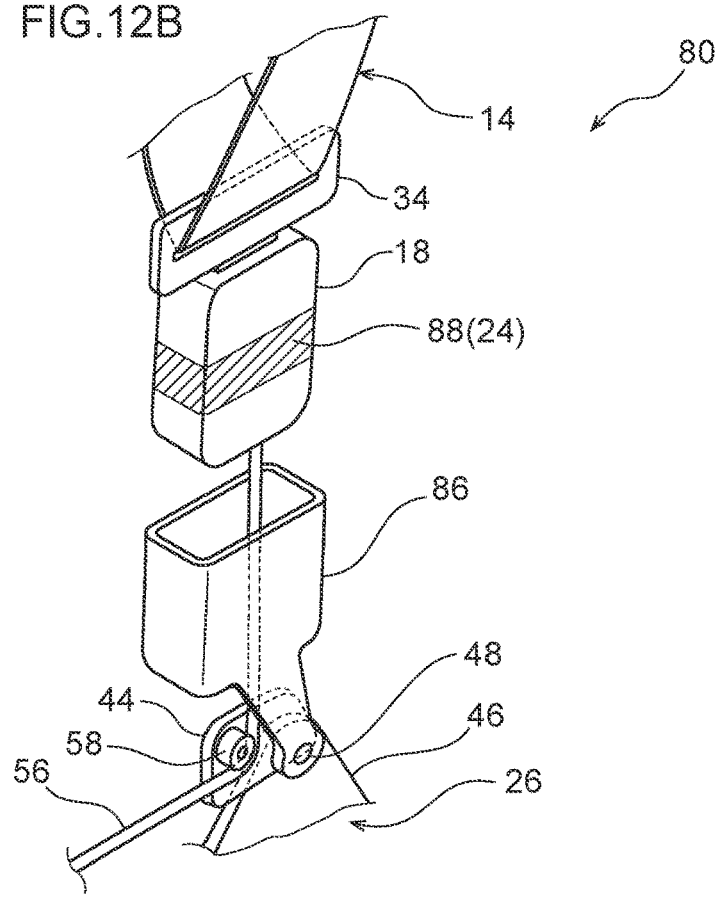

VEHICLE SEAT BELT SYSTEM

CROSS-REFERENCE TO RELATED APPLICATION

This application is based on and claims priority under 35 USC 119 from Japanese Patent Application No. 2017-170559 filed on Sep. 5, 2017, the disclosure of which is incorporated by reference herein.

BACKGROUND

Technical Field

The present disclosure relates to a vehicle seat belt system.

Related Art

Japanese Patent Application Laid-open (JP-A) No. 2001-322531 discloses a buckle device having a buckle body, with which a tongue of a seat belt becomes engaged, and a pretensioner, which causes the buckle body to move backward in an emergency. This buckle device is equipped with a shock absorbing mechanism (force limiter) that allows the buckle body to move in a direction of forward propulsion when a predetermined forward propulsion force or greater has been applied to the buckle body after the buckle body has moved backward.

Furthermore, JP-A No. 2013-18460 discloses a vehicle seat belt system where one end of webbing can be taken up by a seat belt retractor equipped with a pretensioner. The other end of the webbing is anchored via a lap outer pretensioner to an outer surface of a vehicle seat or to a vehicle body. The other end of a buckle is secured, via a force limiter having an energy absorbing (EA) function, to the vehicle body or to the vehicle seat.

Moreover, JP-A No. H10-100860 discloses a shock absorption device (force limiter) provided on the anchored side (buckle) of a vehicle seat belt.

In the conventional example disclosed in JP-A No. 2001-322531, the position of the buckle changes to a position higher than normal because of activation of the force limiter, and the position of the tongue plate engaged with the buckle also becomes higher.

When this happens, the ability of the webbing to restrain the occupant is affected, so it is not preferred that the webbing be refastened and used in a state in which the position of the buckle remains changed. In a case where the force limiter has been activated, it is preferred that this be detected and that the occupant be notified of the abnormality.

In a case where the buckle is provided with a pretensioner and a force limiter as in the conventional example disclosed in JP-A No. 2001-322531, the fact that the initiator of the gas generator becomes disconnected by an explosive in the activation of the pretensioner can be utilized to electrically detect the activation of the force limiter thereafter.

However, in a case where the buckle is not provided with a pretensioner as in the conventional examples disclosed in JP-A No. 2013-18460 and JP-A No. H10-100860, it has been difficult to detect the activation of the force limiter.

SUMMARY

It is an object of the present disclosure to prevent, in a configuration where a buckle is provided with a force limiter but is not provided with a pretensioner, use of webbing after activation of the force limiter.

A vehicle seat belt system pertaining to a first aspect includes: webbing that has one end anchored to one seat width direction side surface of a vehicle seat or to a vehicle body, and that restrains an occupant seated in the vehicle seat; a retractor to which another end of the webbing is engaged and that is configured to take up the webbing, the retractor being provided with a pretensioner which, when activated, pulls in the webbing; a buckle, that is provided on another seat width direction side surface of the vehicle seat or on the vehicle body, with which a tongue plate attached to the webbing can be engaged; a force limiter that allows the buckle to move to thereby reduce a tensile load acting on the webbing due to activation of the pretensioner; and a warning section that is configured to utilize movement of the buckle resulting from the force limiter to notify the occupant of an abnormality that the force limiter has been activated.

In this vehicle seat belt system, the occupant seated in the vehicle seat fastens the webbing by pulling out the webbing from the retractor and causing the tongue plate attached to the webbing to engage with the buckle. At the time of a vehicle collision, for example, the pretensioner of the retractor is activated, whereby a tensile load acts on the webbing and the restraining force on the occupant is increased. Thereafter, when the force limiter is activated, the buckle moves and the tensile load that acted on the webbing is reduced. The warning section utilizes the movement of the buckle resulting from the force limiter to notify the occupant of the abnormality that the force limiter has been activated. Because of this, the need to service the vehicle can be relayed to the occupant.

A second aspect is the vehicle seat belt system pertaining to the first aspect, wherein the warning section is configured to electrically detect the movement of the buckle and electrically notify the occupant of the abnormality.

In this vehicle seat belt system, the warning section electrically detects the movement of the buckle resulting from the force limiter and electrically notifies the occupant of the abnormality, so an existing warning electrical circuit in the vehicle can be utilized.

A third aspect is the vehicle seat belt system pertaining to the second aspect, wherein the warning section includes an electrical circuit and is configured such that electrical resistance in the electrical circuit changes when part of the electrical circuit becomes disconnected due to the movement of the buckle, and the warning section determines, in accordance with the electrical resistance, whether or not the force limiter has been activated.

In this vehicle seat belt system, the electrical resistance in the electrical circuit changes when part of the electrical circuit of the warning section becomes disconnected due to the movement of the buckle. The warning section discriminates, in accordance with the electrical resistance, whether or not the force limiter has been activated and notifies the occupant of the abnormality in a case where the force limiter has been activated. By using the electrical circuit in the warning section, an existing warning electrical circuit in the vehicle can be utilized.

A fourth aspect is the vehicle seat belt system pertaining to the second aspect or the third aspect, wherein the warning section is configured to notify the occupant of an abnormality when the buckle and the tongue plate are not engaged with each other and also notify the occupant of the abnormality, regardless of whether or not the buckle and the tongue plate are engaged with each other, when the force limiter has been activated.

In this vehicle seat belt system, when the buckle and the tongue plate are not engaged with each other, the warning section notifies the occupant of the abnormality that the webbing is not fastened. Because of this, the occupant can be prompted to fasten the webbing. Furthermore, when the force limiter has been activated and the buckle is moving because of the force limiter, the warning section notifies the occupant of the abnormality regardless of whether or not the buckle and the tongue plate are engaged with each other, namely, whether or not the webbing is fastened. At this time, the warning section may distinguish between, or may not distinguish between, and notify the occupant of the abnormality that the webbing is not fastened and the abnormality that the force limiter has been activated.

A fifth aspect is the vehicle seat belt system pertaining to the fourth aspect, wherein the warning section is configured to distinguish between, and notify the occupant of, the abnormality when the buckle and the tongue plate are not engaged with each other, and the abnormality when the force limiter has been activated.

In this vehicle seat belt system, the warning section distinguishes between, and notifies the occupant of, the abnormality when the buckle and the tongue plate are not engaged with each other and the abnormality when the force limiter has been activated. When the force limiter has not yet been activated and the buckle and the tongue plate are not engaged with each other, the warning section notifies the occupant of the abnormality that the occupant has not fastened the webbing. When the force limiter has been activated, the warning section notifies the occupant of the abnormality that the force limiter has been activated. It will be noted that when the buckle and the tongue plate are not engaged with each other, the warning section may notify the occupant of both the abnormality that the occupant has not fastened the webbing and the abnormality that the force limiter has been activated. When the force limiter has been activated and the buckle and the tongue plate are engaged with each other, the warning section may notify the occupant of just the abnormality that the force limiter has been activated.

A sixth aspect is the vehicle seat belt system pertaining to (an aspect pertaining to the third aspect of) the fifth aspect, wherein the electrical circuit includes a circuit that interconnects point A and point B, which are measurement points of the electrical resistance, a buckle switch that is provided in the circuit and switches ON and OFF depending on whether or not the tongue plate is engaged with the buckle, a movement detection switch that is provided in series with the buckle switch in the circuit and switches from ON to OFF due to the movement of the buckle, and a resistor that is provided in parallel with the buckle switch in the circuit.

In this vehicle seat belt system, when the force limiter has not yet been activated and the buckle is not moving, the movement detection switch is ON. In this state, the electrical resistance between point A and point B becomes 0 when the buckle switch is ON and becomes the resistance value of the resistor when the buckle switch is OFF. Because of this difference in electrical resistance, whether or not the tongue plate is engaged with the buckle can be discriminated. When the buckle and the tongue plate are not engaged with each other, the warning section notifies the occupant of the abnormality that the occupant has not fastened the webbing. It will be noted that whether to give the buckle switch an ON setting or an OFF setting when the buckle and the tongue plate are engaged with each other is arbitrary.

When the force limiter has been activated and the buckle is moving, the movement detection switch switches OFF. The resistor is provided in parallel with the buckle switch, and the buckle switch is provided in series with the movement detection switch, so when the movement detection switch switches OFF, the path between point A and point B becomes no longer conductive and the electrical resistance between point A and point B becomes ∞. Namely, whether or not the force limiter has been activated can be discriminated depending on whether or not the electrical resistance between point A and point B is ∞. When the force limiter has been activated, the warning section notifies the occupant of that abnormality.

A seventh aspect is the vehicle seat belt system pertaining to (an aspect pertaining to the third aspect of) the fifth aspect, wherein the electrical circuit includes: a circuit that interconnects point A and point B, which are measurement points of the electrical resistance; a buckle switch that is provided in the circuit and switches ON and OFF depending on whether or not the tongue plate is engaged with the buckle; a movement detection switch that is provided in series with the buckle switch in the circuit and switches from ON to OFF due to the movement of the buckle; a first resistor that is provided in parallel with the buckle switch in the circuit; and a second resistor that is provided in parallel with the buckle switch and the movement detection switch in the circuit and whose resistance value is different from that of the first resistor.

In the present disclosure, "ON" means a conductive state and "OFF" means a non-conductive state. In this vehicle seat belt system, when the force limiter has not yet been activated and the buckle is not moving, the movement detection switch is ON. In this state, the electrical resistance between point A and point B becomes 0 when the buckle switch is ON and becomes a value in which the resistance value of the first resistor and the resistance value of the second resistor are combined in parallel when the buckle switch is OFF. Because of this difference in electrical resistance, whether or not the tongue plate is engaged with the buckle can be discriminated. When the buckle and the tongue plate are not engaged with each other, the warning section notifies the occupant of the abnormality that the occupant has not fastened the webbing. It will be noted that whether to give the buckle switch an ON setting or an OFF setting when the buckle and the tongue plate are engaged with each other is arbitrary.

When the force limiter has been activated and the buckle is moving, the movement detection switch switches OFF. At this time, the conduction path between point A and point B includes just the second resistor provided in parallel with the buckle switch and the movement detection switch and no longer includes the first resistor. Furthermore, the buckle switch is provided in series with the movement detection switch, so when the movement detection switch switches OFF, the conduction path between point A and point B no longer includes the buckle switch. Consequently, the electrical resistance between point A and point B becomes the resistance value of the second resistor regardless of the state of the buckle switch. Namely, whether or not the force limiter has been activated can be discriminated depending on whether or not the electrical resistance between point A and point B is the resistance value of the second resistor. When the force limiter has been activated, the warning section notifies the occupant of that abnormality.

An eighth aspect is the vehicle seat belt system pertaining to (an aspect pertaining to the third aspect of) the fifth aspect, wherein the electrical circuit includes a circuit that interconnects point A and point B, which are measurement points of the electrical resistance, a Hall switch that is provided in the circuit, a resistance value of the Hall switch changing depending on whether or not the tongue plate is engaged with the buckle, and a movement detection switch that is provided in series with the Hall switch in the circuit and becomes disconnected due to the movement of the buckle.

In this vehicle seat belt system, when the force limiter has not yet been activated and the buckle switch is not moving, the movement detection switch is ON. In this state, the electrical resistance between point A and point B becomes the resistance value of the Hall switch. The resistance value of the Hall switch changes depending on whether or not the tongue plate is engaged with the buckle, so because of this difference in electrical resistance, whether or not the tongue plate is engaged with the buckle can be discriminated. When the buckle and the tongue plate are not engaged with each other, the warning section notifies the occupant of the abnormality that the webbing is not fastened.

When the force limiter has been activated and the buckle is moving, the movement detection switch switches OFF. The Hall switch is provided in series with the movement detection switch, so when the movement detection switch switches OFF, the path between point A and point B becomes no longer conductive and the electrical resistance between point A and point B becomes ∞. Namely, whether or not the force limiter has been activated can be discriminated depending on whether or not the electrical resistance between point A and point B is ∞. When the force limiter has been activated, the warning section notifies the occupant of that abnormality.

A ninth aspect is the vehicle seat belt system pertaining to (an aspect pertaining to a third aspect of) the fifth aspect, wherein the electrical circuit includes: a circuit that interconnects point A and point B, which are measurement points of the electrical resistance; a Hall switch that is provided in the circuit, a resistance value of the Hall switch changing depending on whether or not the tongue plate is engaged with the buckle; a movement detection switch that is provided in series with the Hall switch in the circuit and becomes disconnected due to the movement of the buckle, and a resistor that is provided in parallel with the Hall switch and the movement detection switch in the circuit and that has a resistance value is different from that of the Hall switch.

In this vehicle seat belt system, when the force limiter has not yet been activated and the buckle is not moving, the movement detection switch is ON. In this state, the electrical resistance between point A and point B becomes a value in which the resistance value of the Hall switch and the resistance value of the resistor are combined in parallel. The resistance value of the Hall switch changes depending on whether or not the tongue plate is engaged with the buckle, so because of the difference in electrical resistance between point A and point B, whether or not the tongue plate is engaged with the buckle can be discriminated. When the buckle and the tongue plate are not engaged with each other, the warning section notifies the occupant of the abnormality that the webbing is not fastened.

When the force limiter has been activated and the buckle is moving, the movement detection switch switches OFF. At this time, the conduction path between point A and point B includes only the resistor. The Hall switch is provided in series with the movement detection switch, so when the movement detection switch switches OFF, the conduction path between point A and point B no longer includes the Hall switch. Consequently, the electrical resistance between point A and point B becomes the resistance value of the resistor regardless of the resistance value of the Hall switch. Namely, whether or not the force limiter has been activated can be discriminated depending on whether or not the electrical resistance between point A and point B is the resistance value of the resistor. When the force limiter has been activated, the warning section notifies the occupant of that abnormality.

A tenth aspect is the vehicle seat belt system pertaining to (an aspect pertaining to the third aspect of) the fifth aspect, wherein the electrical circuit includes: a first circuit that interconnects point A and point B, which are measurement points of the electrical resistance; a buckle switch that is provided in the first circuit and switches ON and OFF depending on whether or not the tongue plate is engaged with the buckle; a second circuit that is provided separately from the first circuit and interconnects point C and point D, which are measurement points of the electrical resistance; and a movement detection switch that is provided in the second circuit and becomes disconnected due to the movement of the buckle.

In this vehicle seat belt system, whether or not the tongue plate is engaged with the buckle is discriminated with the first circuit, and whether or not the force limiter has been activated is discriminated with the second circuit.

The buckle switch is provided in the first circuit that interconnects point A and point B, and the electrical resistance between point A and point B becomes 0 when the buckle switch is ON and becomes ∞ when the buckle switch is OFF. Because of this difference in electrical resistance, whether or not the tongue plate is engaged with the buckle can be discriminated. When the buckle and the tongue plate are not engaged with each other, the warning section notifies the occupant of the abnormality that the occupant has not fastened the webbing. It will be noted that whether to give the buckle switch an ON setting or an OFF setting when the buckle and the tongue plate are engaged with each other is arbitrary.

When the force limiter has not yet been activated, the movement detection switch provided in the second circuit that interconnects point C and point D is ON and the electrical resistance between point C and point D becomes 0. When the force limiter has been activated and the buckle is moving, the movement detection switch switches OFF and the electrical resistance between point C and point D becomes ∞. Namely, whether or not the force limiter has been activated can be discriminated depending on whether the electrical resistance between point C and point D is 0 or ∞. When the force limiter has been activated, the warning section notifies the occupant of that abnormality.

An eleventh aspect is the vehicle seat belt system pertaining to (an aspect pertaining to the third aspect of) the fifth aspect, wherein the electrical circuit includes: a first circuit that interconnects point A and point B, which are measurement points of the electrical resistance; a buckle switch that is provided in the first circuit and switches ON and OFF depending on whether or not the tongue plate is engaged with the buckle; a second circuit that interconnects point C and point D that measure the electrical resistance separately from the first circuit; a movement detection switch that is provided in the second circuit and becomes disconnected due to the movement of the buckle; and a resistor that is provided in parallel with the movement detection switch in the second circuit.

In this vehicle seat belt system, whether or not the tongue plate is engaged with the buckle is discriminated with the first circuit, and whether or not the force limiter has been activated is discriminated with the second circuit.

The buckle switch is provided in the first circuit that interconnects point A and point B, and the electrical resistance between point A and point B becomes 0 when the buckle switch is ON and becomes ∞ when the buckle switch is OFF. Because of this difference in electrical resistance, whether or not the tongue plate is engaged with the buckle can be discriminated. When the buckle and the tongue plate are not engaged with each other, the warning section notifies the occupant of the abnormality that the occupant has not fastened the webbing. It will be noted that whether to give the buckle switch an ON setting or an OFF setting when the buckle and the tongue plate are engaged with each other is arbitrary.

When the force limiter has not yet been activated, the movement detection switch provided in the second circuit that interconnects point C and point D is ON and the electrical resistance between point C and point D becomes 0. When the force limiter has been activated and the buckle is moving, the movement detection switch switches OFF. At this time, the conduction path between point C and point D includes just the resistor. Consequently, the electrical resistance between point C and point D becomes the resistance value of the resistor. Namely, whether or not the force limiter has been activated can be discriminated depending on whether the electrical resistance between point C and point D is 0 or the resistance value of the resistor. When the force limiter has been activated, the warning section notifies the occupant of that abnormality.

A twelfth aspect is the vehicle seat belt system pertaining to the fourth aspect, wherein the warning section is configured to notify the occupant of, without distinguishing between, the abnormality when the buckle and the tongue plate are not engaged with each other and the abnormality when the force limiter has been activated.

In this vehicle seat belt system, the warning section notifies the occupant of, without distinguishing between, the abnormality when the buckle and the tongue plate are not engaged with each other and the abnormality when the force limiter has been activated. When the force limiter has not yet been activated and the buckle and the tongue plate are not engaged with each other, the warning section notifies the occupant of an abnormality. And when the force limiter has been activated, the warning section likewise notifies the occupant of an abnormality.

A thirteenth aspect is the vehicle seat belt system pertaining to the twelfth aspect, wherein the electrical circuit includes: a circuit that interconnects point A and point B, which are measurement points of the electrical resistance; a buckle switch that is provided in the circuit and detects whether or not the tongue plate is engaged with the buckle; and a movement detection switch that is provided in series with the buckle switch in the circuit and becomes disconnected due to the movement of the buckle.

In this vehicle seat belt system, the buckle switch and the movement detection switch are provided in series between point A and point B. Consequently, the electrical resistance between point A and point B becomes 0 when both switches are ON and becomes ∞ when at least one of the switches is OFF. When the electrical resistance between point A and point B is ∞, the warning section notifies the occupant of an abnormality.

A fourteenth aspect is the vehicle seat belt system pertaining to any one of the third to thirteenth aspects, wherein the electrical circuit includes an extra length portion that allows the buckle to move.

In this vehicle seat belt system, the electrical circuit has the extra length portion that allows the buckle to move, so the circuit is kept from becoming disconnected when the buckle moves because of the force limiter.

A fifteenth aspect is the vehicle seat belt system pertaining to the first aspect, further including a cover member that overlaps a side portion of the buckle, wherein an indicator that indicates that the force limiter has been activated is provided as the warning section in the side portion, and the indicator is hidden by the cover member when the force limiter has not yet been activated and appears due to movement of the buckle relative to the cover member.

In this vehicle seat belt system, when the force limiter has not yet been activated, the indicator that indicates that the force limiter has been activated is hidden by the cover member of the buckle. When the buckle moves relative to the cover member due to activation of the force limiter, the indicator that indicates that the force limiter has been activated appears. Because of this, the need to service the vehicle can be relayed to the occupant.

A sixteenth aspect is the vehicle seat belt system pertaining to the first aspect, further including a cover member that overlaps a side portion of the buckle, wherein the vehicle seat belt system has, as the warning section, a capsule that bursts due to the movement of the buckle relative to the cover member and produces a gas that the occupant can sense.

In this vehicle seat belt system, when the buckle moves relative to the cover member due to activation of the force limiter, the capsule bursts and the gas that the occupant can sense is produced. The occupant can detect an abnormality by sensing this gas.

A seventeenth aspect is the vehicle seat belt system pertaining to the first aspect, wherein the warning section has a configuration that increases, due to the movement of the buckle, the load needed for the tongue plate to engage with the buckle.

In this vehicle seat belt system, when the buckle moves because of the force limiter, the load needed for the tongue plate to engage with the buckle increases. Consequently, when thereafter the occupant tries to cause the tongue plate to engage with the buckle, the occupant feels a stronger resistance than usual. The occupant can detect an abnormality by feeling the change in the resistance.

According to the vehicle seat belt system pertaining to the first aspect, in a configuration where the buckle is provided with a force limiter but is not provided with a pretensioner, use of the webbing after activation of the force limiter can be prevented.

According to the vehicle seat belt system pertaining to the second aspect and the third aspect, use of the webbing after activation of the force limiter can be prevented at a low cost.

According to the vehicle seat belt system pertaining to the fourth aspect, the occupant can be prompted to fasten the webbing in normal times when the force limiter has not yet been activated, and use of the webbing after activation of the force limiter can be prevented.

According to the vehicle seat belt system pertaining to the fifth to eleventh aspects, the occupant can distinguish between the abnormality that the webbing is not fastened and the abnormality that the force limiter has been activated.

According to the vehicle seat belt system pertaining to the twelfth aspect and the thirteenth aspect, the occupant can be notified of an abnormality at a low cost.

According to the vehicle seat belt system pertaining to the fourteenth aspect, the function of the electrical circuit can be maintained even after the movement of the buckle resulting from the force limiter.

According to the vehicle seat belt system pertaining to the fifteenth aspect, use of the webbing after activation of the force limiter can be prevented easily and with a configuration that the occupant can see.

According to the vehicle seat belt system pertaining to the sixteenth aspect, use of the webbing after activation of the force limiter can be prevented easily and with a configuration that the occupant can sense.

According to the vehicle seat belt system pertaining to the seventeenth aspect, use of the webbing after activation of the force limiter can be prevented with a configuration that imparts to the occupant a feeling that something is wrong.

BRIEF DESCRIPTION OF THE DRAWINGS

Exemplary embodiments of the present disclosure will be described in detail based on the following figures, wherein:

FIG. 2 is an enlarged side view showing the state of a buckle and an electrical circuit when a force limiter has not yet been activated in the vehicle seat belt system pertaining to the first embodiment;

FIG. 4 is an enlarged side view showing the state of the buckle and the electrical circuit after activation of the force limiter in the vehicle seat belt system pertaining to the first embodiment;

FIG. 12A is a perspective view showing the state of the buckle before activation of the force limiter in a vehicle seat belt system pertaining to an eighth embodiment;

FIG. 12B is a perspective view showing a state in which a warning indicator has appeared on a side surface of the buckle after activation of the force limiter;

DETAILED DESCRIPTION

Figure 1:
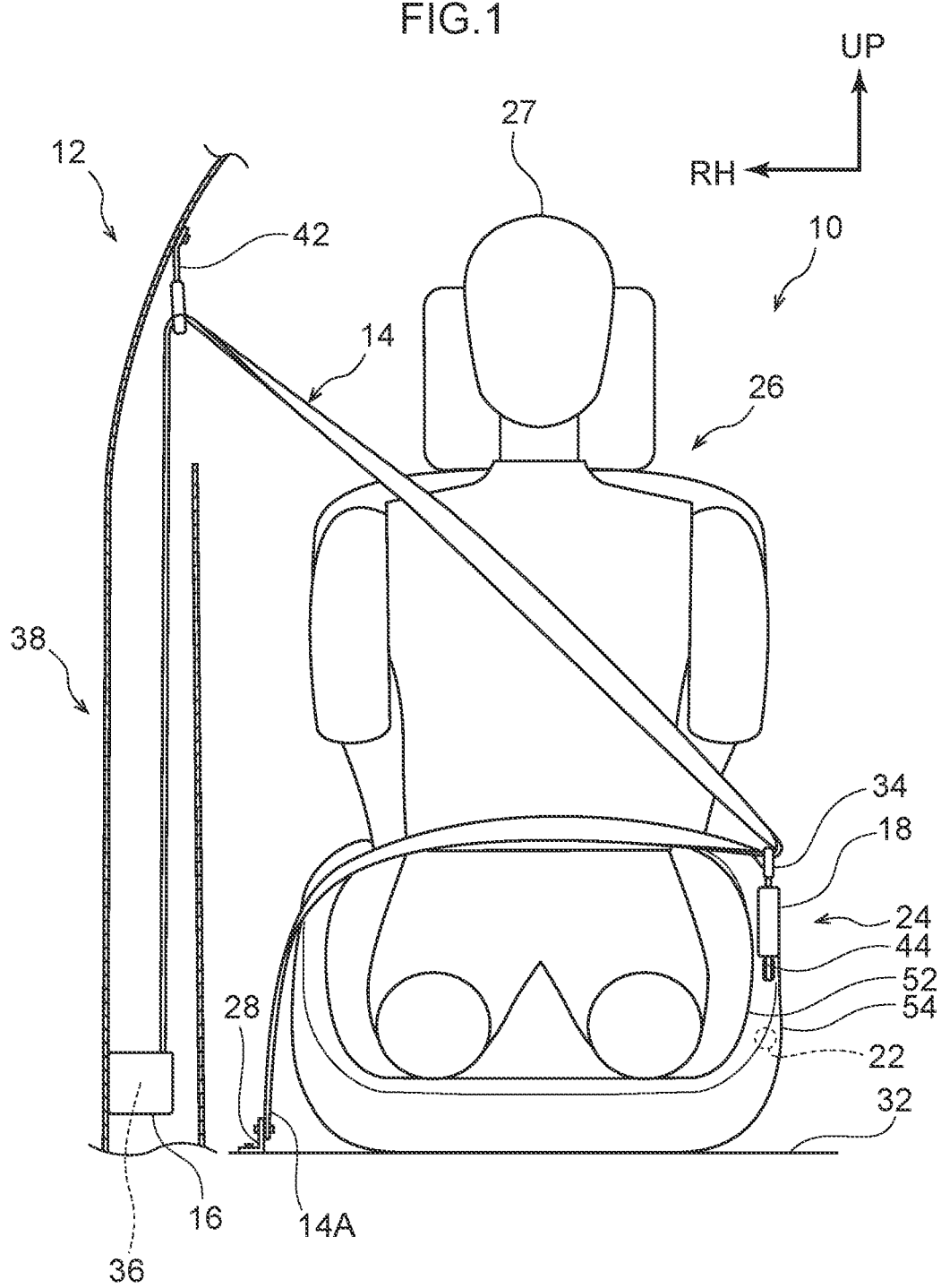
FIG. 1 is a front view showing a state in which webbing is fastened around an occupant seated in a vehicle seat in a vehicle seat belt system pertaining to a first embodiment.

Modes for implementing the present disclosure will be described below based on the drawings. In the drawings, arrow FR indicates a vehicle forward direction, arrow UP indicates a vehicle upward direction, and arrow RH indicates a vehicle rightward direction.

First Embodiment

In FIG. 1 and FIG. 2, a vehicle seat belt system 10 pertaining to the present embodiment is an example of an occupant restraint system used in a vehicle 12. The vehicle seat belt system 10 is equipped with webbing 14, a retractor 16, a buckle 18, a force limiter 22, and a warning section 24.

The webbing 14 is a flexible band-like member. One end 14A of the webbing 14 is anchored to one seat width direction side surface of a vehicle seat 26 or to a vehicle body. When fastened, the webbing 14 restrains an occupant 27 seated in the vehicle seat 26. In the example shown in FIG. 1, the one end 14A of the webbing 14 is anchored to a floor 32 on the vehicle width direction outer side of the vehicle seat 26 using an anchor 28. A tongue plate 34 is attached to the webbing 14.

In FIG. 1, the other end (not shown in the drawings) of the webbing 14 is engaged with the retractor 16, and the retractor 16 is capable of taking up the webbing 14. The other end of the webbing 14 is engaged with a spool (not shown in the drawings) inside the retractor 16. The retractor 16 is provided with a pretensioner 36 which, when activated, pulls in the webbing 14. The retractor 16 is attached to the lower portion of a center pillar 38 of the vehicle 12, for example. A shoulder anchor 42 is attached to the upper portion of the center pillar 38. The webbing 14 is pulled out in the vehicle upward direction from the retractor 16 and is pulled out toward the vehicle seat 26 through the shoulder anchor 42.

In FIG. 1 and FIG. 2, the buckle 18 is provided on the other seat width direction side surface of the vehicle seat 26 or on the vehicle body. The tongue plate 34 attached to the webbing 14 can engage with the buckle 18. In the example shown in the drawings, a bracket 44 of the buckle 18 is provided, in such a way as to be swingable in the vehicle front and rear direction via a support shaft 48, on a seat frame 46 on the vehicle width direction inner side of the vehicle seat 26. Where the bracket 44 and the seat frame 46 are engaged with each other is covered by a side cover 54 of a seat cushion 52 (FIG. 1). The tongue plate 34 becomes engaged with the buckle 18 by being inserted into the buckle 18. Furthermore, the tongue plate 34 can be disengaged from the buckle 18 by operating a release button (not shown in the drawings) on the buckle 18.

In FIG. 2, the force limiter 22 is a shock absorbing device that allows the buckle 18 to move to thereby reduce the tensile load that acted on the webbing 14 because of the activation of the pretensioner 36. The force limiter 22 is provided on the vehicle front side of the bracket 44, for example. The force limiter 22 and the buckle 18 are coupled to each other via a flexible load transmitting member 56 such as a wire. A guide pin 58 that guides the load transmitting member 56 is provided on the bracket 44. The force limiter 22 allows the buckle 18 to move in the vehicle upward direction when a predetermined tensile load or greater acts on the webbing 14.

The warning section 24 is a device that utilizes the movement of the buckle 18 resulting from the force limiter 22 to notify the occupant 27 (FIG. 1) of the abnormality that the force limiter 22 has been activated. The warning section 24 electrically detects the movement of the buckle 18 and electrically notifies the occupant 27 of the abnormality. In order to electrically notify the occupant 27 of the abnormality, an existing warning electrical circuit—e.g., means such as a warning lamp or a warning sound generating device (neither of which is shown in the drawings)—may be used.

Figure 3A:
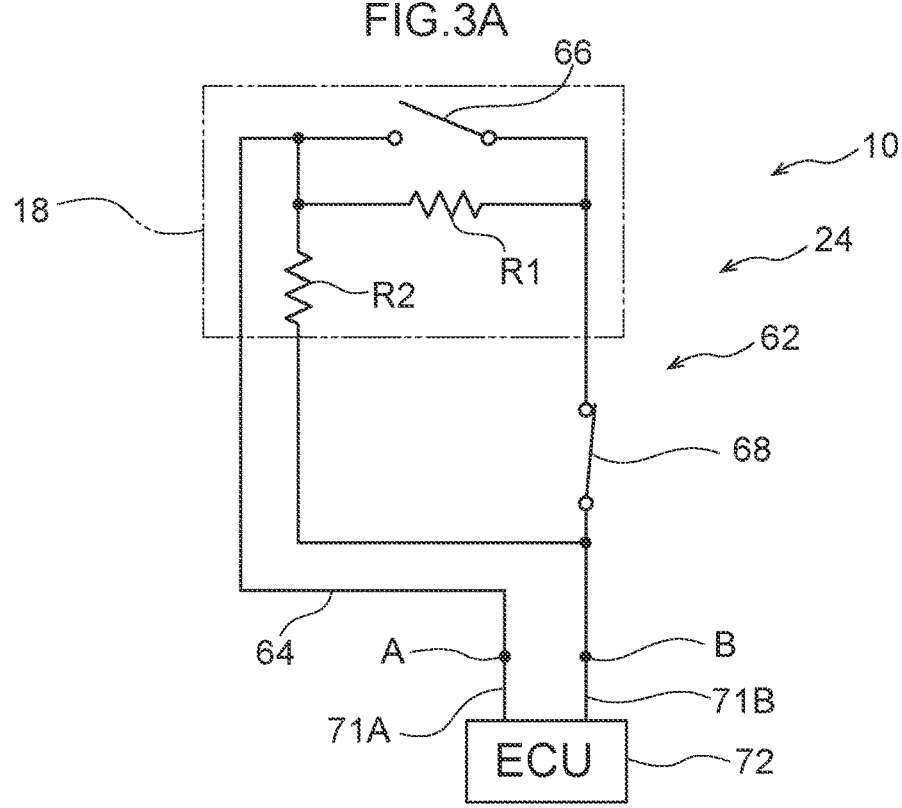
FIG. 3A is a circuit diagram showing a state in which a buckle switch is OFF and a movement detection switch is ON in an electrical circuit of a warning section in the first embodiment.
Figure 3B:
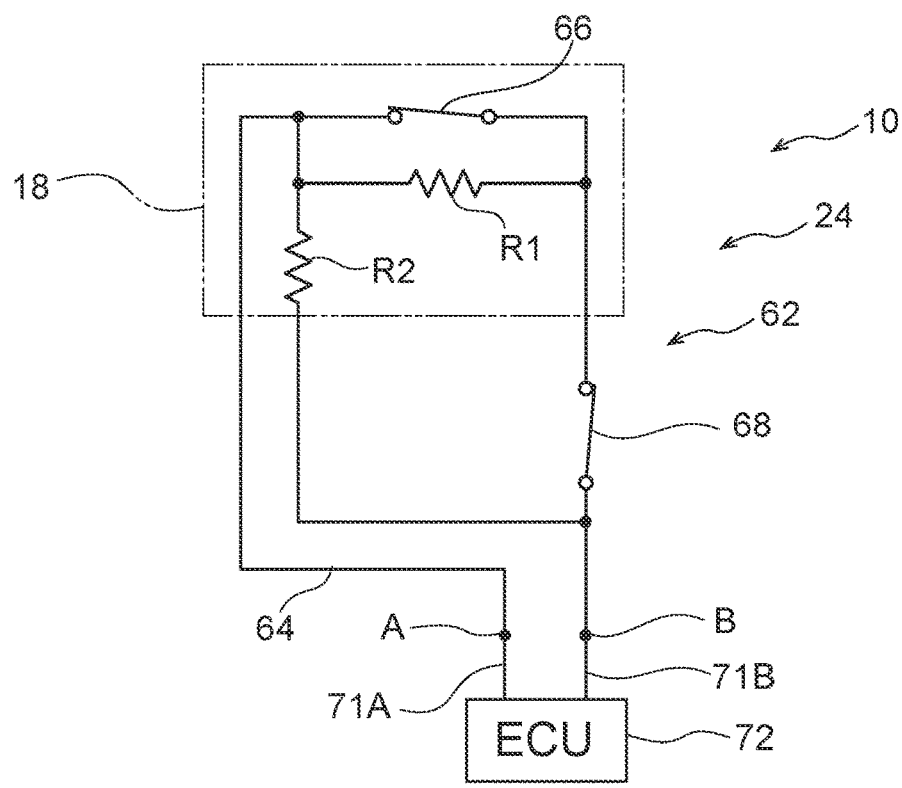
FIG. 3B is a circuit diagram showing a state in which the buckle switch and the movement detection switch are ON in the electrical circuit of the warning section in the first embodiment.

As shown in FIG. 2, FIG. 3A, and FIG. 3B, the warning section 24 has an electrical circuit 62 and also has a configuration where electrical resistance in the electrical circuit 62 changes when part of the electrical circuit 62 becomes disconnected due to the movement of the buckle 18. The warning section 24 discriminates, in accordance with the electrical resistance, whether or not the force limiter 22 has been activated.

Furthermore, the warning section 24 notifies the occupant 27 of an abnormality when the buckle 18 and the tongue plate 34 are not engaged with each other and also notifies the occupant 27 of an abnormality, regardless of whether or not the buckle 18 and the tongue plate 34 are engaged with each other, when the force limiter 22 has been activated. Moreover, the warning section 24 distinguishes between, and notifies the occupant 27 of, an abnormality when the buckle 18 and the tongue plate 34 are not engaged with each other and an abnormality when the force limiter 22 has been activated.

In FIG. 3A and FIG. 3B, the electrical circuit 62 has a circuit 64, a buckle switch 66, a movement detection switch 68, a first resistor R1, and a second resistor R2. The circuit 64 interconnects point A and point B, which are measurement points of the electrical resistance. An electronic control unit (ECU) 72, for example, is connected via leads 71A and 71B to point A and point B. A means such as a warning lamp that electrically notifies the occupant 27 of an abnormality is also connected to the ECU 72.

The buckle switch 66 is provided in the circuit 64 and switches ON and OFF depending on whether or not the tongue plate 34 is engaged with the buckle 18 (FIG. 2 and FIG. 4). In the present embodiment, when the tongue plate 34 and the buckle 18 are not engaged with each other, namely, when the webbing 14 is not fastened, the buckle switch 66 switches ON. Furthermore, when the tongue plate 34 and the buckle 18 are engaged with each other, namely, when the webbing 14 is fastened, the buckle switch 66 switches OFF. In the present embodiment, "ON" means a conductive state and "OFF" means a non-conductive state.

As shown in FIG. 3A and FIG. 3B, the movement detection switch 68 is provided in series with the buckle switch 66 in the circuit 64 and switches from ON to OFF due to the movement of the buckle 18. As shown in FIG. 2 and FIG. 4, the movement detection switch 68 is, for example, configured as a connector. For example, a male connector 74 is attached to the bracket 44, and a female connector 76 is attached to the buckle 18. As shown in FIG. 2, when the force limiter 22 has not yet been activated and the buckle 18 is in a normal position, the male connector 74 and the female connector 76 are connected to each other. When the buckle 18 moves due to activation of the force limiter 22, the male connector 74 and the female connector 76 become disconnected from each other. Because of this, the movement detection switch 68 switches from ON to OFF. It will be noted that the movement detection switch 68 is not limited to a connector and may also have a configuration where a lead becomes disconnected due to the movement of the buckle 18.

The electrical circuit 62 has an extra length portion 78 that allows the buckle 18 to move. This is to ensure that, when the buckle 18 moves, no part of the circuit 64 between point A and point B except for the movement detection switch 68 becomes disconnected unnecessarily. The extra length portion 78 is formed in an extendible/contractible coil shape, for example. It will be noted that the configuration of the extra length portion 78 is not limited to a coil shape and may also be a slack or bent lead, for example. Furthermore, the extra length portion 78 does not need to be provided so long as the electrical circuit 62 has a configuration where an unnecessary disconnection does not occur in the circuit 64 and conductivity is maintained when the buckle 18 moves. Furthermore, a conductivity maintaining means different from the extra length portion 78 may also be provided.

In FIG. 3A and FIG. 3B, the first resistor R1 is provided in parallel with the buckle switch 66 in the circuit 64. The second resistor R2 is provided in parallel with the buckle switch 66 and the movement detection switch 68 in the circuit 64, and its resistance value is different from that of the first resistor R1. In the present embodiment, the electrical resistance of the first resistor R1 is 1 Ω, and the electrical resistance of the second resistor R2 is 2 Ω. In FIG. 3A and FIG. 3B, the long dashed double-short dashed line surrounding the buckle switch 66, the first resistor R1, and the second resistor R2 represents the buckle 18. This shows that the buckle switch 66, the first resistor R1, and the second resistor R2 are disposed inside the buckle 18.

(Action)

The present embodiment is configured as described above, and the action thereof will be described below. In FIG. 1, in the vehicle seat belt system 10 pertaining to the present embodiment, the occupant 27 seated in the vehicle seat 26 fastens the webbing 14 by pulling out the webbing 14 from the retractor 16 and causing the tongue plate 34 attached to the webbing 14 to engage with the buckle 18. At the time of a vehicle collision, for example, the pretensioner 36 of the retractor 16 is activated, whereby a tensile load acts on the webbing 14 and the restraining force on the occupant 27 is increased. Thereafter, as shown in FIG. 4, when the force limiter 22 is activated, the buckle 18 moves in the vehicle upward direction and the tensile load that acted on the webbing 14 is reduced. At this time, the electrical circuit 62 has the extra length portion 78 that allows the buckle 18 to move, so the circuit 64 is kept from becoming disconnected when the buckle 18 moves because of the force limiter 22. For this reason, the function of the electrical circuit 62 can be maintained even after the movement of the buckle 18 resulting from the force limiter 22.

In this vehicle seat belt system 10, the warning section 24 electrically detects the movement of the buckle 18 resulting from the force limiter 22 and electrically notifies the occupant 27 of an abnormality, so an existing warning electrical circuit (not shown in the drawings) in the vehicle 12 can be utilized and costs can be reduced. Furthermore, by notifying the occupant 27 of an abnormality, the need to service the vehicle, such as replace the force limiter 22, can be relayed.

TABLE 1

| State of Webbing | Electrical Resistance Ω between Point A and Point B | Type of Warning |
|---|---|---|
| Force Limiter Not Yet Activated | Fastened | ⅔ | None |
| | Not Fastened | 0 | Webbing Not Fastened |
| Force Limiter Has Been Activated | Fastened | 2 | Webbing Unusable |
| | Not Fastened | 2 | Webbing Unusable |
| Disconnection on Vehicle Side | | ∞ | Vehicle Abnormality |

In Table 1, FIG. 2, and FIG. 3A, when the force limiter 22 has not yet been activated and the buckle 18 is not moving, the movement detection switch 68 is ON. In this state, the electrical resistance between point A and point B becomes 0 when the buckle switch 66 is ON (FIG. 3B) and becomes a value in which the resistance value of the first resistor R1 and the resistance value of the second resistor R2 are combined in parallel—namely, ⅔ Ω—when the buckle switch 66 is OFF (FIG. 3A).

Because of this difference in electrical resistance, whether or not the tongue plate 34 is engaged with the buckle 18 can be discriminated. When the buckle 18 and the tongue plate 34 are not engaged with each other, the warning section 24 notifies the occupant 27 (FIG. 1) of the abnormality that the occupant 27 has not fastened the webbing 14. Specifically, the warning section 24 can notify the occupant 27 of the abnormality by lighting up a seat belt warning lamp (not shown in the drawings), for example. The seat belt warning lamp goes out when the occupant 27 fastens the webbing 14. It will be noted that Table 1 is an example, and whether to give the buckle switch 66 an ON setting or an OFF setting when the buckle 18 and the tongue plate 34 are engaged with each other (when the belt is fastened) is arbitrary.

Figure 5A:
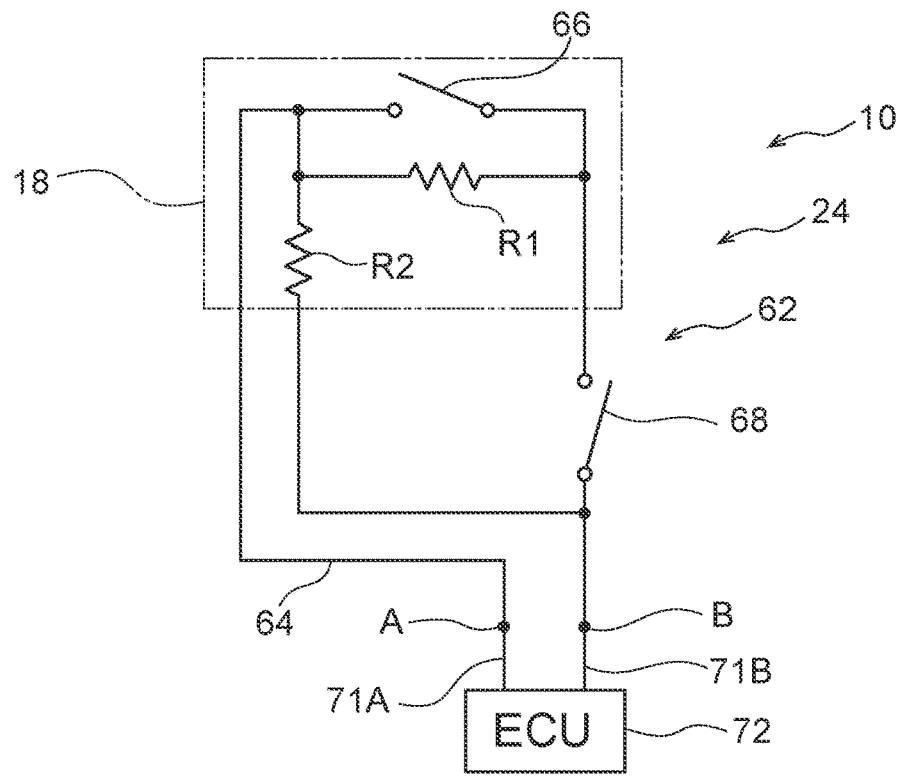
FIG. 5A is a circuit diagram showing a state in which the buckle switch is OFF and the movement detection switch is OFF in the electrical circuit of the warning section in the first embodiment.
Figure 5B:
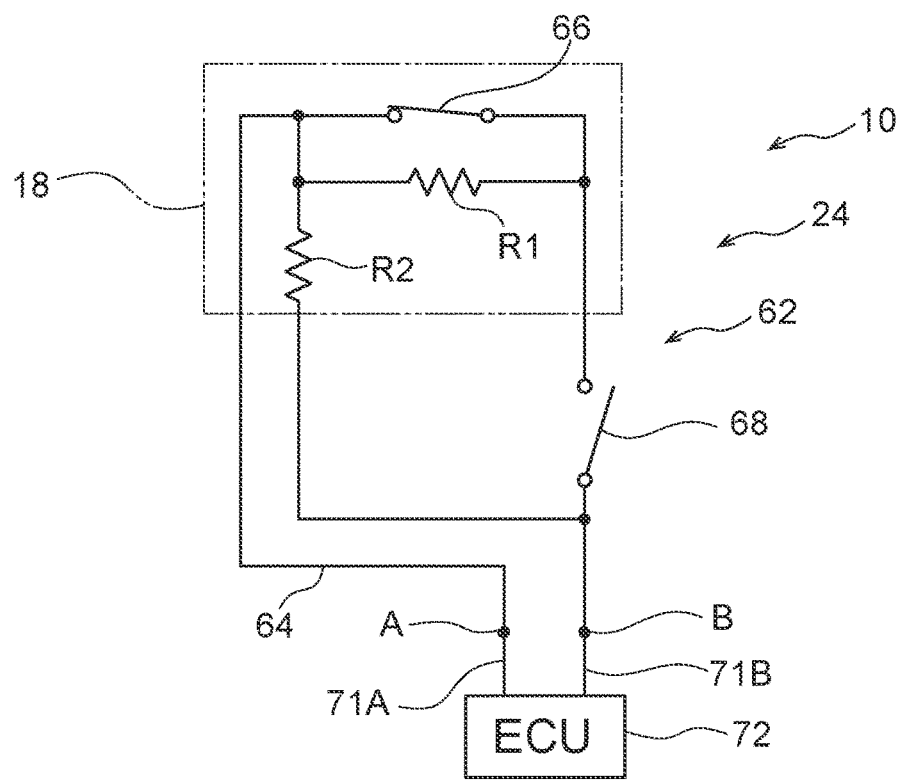
FIG. 5B is a circuit diagram showing a state in which the buckle switch is ON and the movement detection switch is OFF in the electrical circuit of the warning section in the first embodiment.

As shown in FIG. 4, when the force limiter 22 has been activated and the buckle 18 is moving, the movement detection switch 68 switches OFF. Namely, as shown in FIG. 5A and FIG. 5B, part of the electrical circuit 62 of the warning section 24 becomes disconnected due to the movement of the buckle 18. At this time, the conduction path between point A and point B includes only the second resistor R2 provided in parallel with the buckle switch 66 and the movement detection switch 68 and no longer includes the first resistor R1. Furthermore, the buckle switch 66 is provided in series with the movement detection switch 68, so when the movement detection switch 68 switches OFF, the conduction path between point A and point B no longer includes the buckle switch 66. Consequently, the electrical resistance between point A and point B becomes 2 Ω, which is the resistance value of the second resistor R2, regardless of the state of the buckle switch 66. Namely, whether or not the force limiter 22 has been activated can be discriminated depending on whether or not the electrical resistance between point A and point B is the resistance value of the second resistor R2. When the force limiter 22 has been activated, the warning section 24 notifies the occupant 27 of that abnormality (the webbing 14 is unusable). A warning lamp indicating a buckle abnormality (not shown in the drawings), for example, can be used as the means for notifying the occupant 27.

In the present embodiment, the warning lamp 24 distinguishes between, and notifies the occupant 27 of, the abnormality when the buckle 18 and the tongue plate 34 are not engaged with each other and the abnormality when the force limiter 22 has been activated. When the force limiter 22 has not yet been activated and the buckle 18 and the tongue plate 34 are not engaged with each other, the warning section 24 notifies the occupant 27 of the abnormality that the occupant 27 has not fastened the webbing 14. When the force limiter 22 has been activated and the buckle 18 and the tongue plate 34 are not engaged with each other, the warning section 24 notifies the occupant 27 of the abnormality that the occupant 27 has not fastened the webbing 14 and the abnormality that the force limiter 22 has been activated. When the force limiter 22 has been activated and the buckle 18 and the tongue plate 34 are engaged with each other, the warning section 24 notifies the occupant 27 of the abnormality that the force limiter 22 has been activated. For this reason, the occupant 27 can distinguish between the abnormality that the webbing 14 is not fastened and the abnormality that the force limiter 22 has been activated.

In addition, in a case where there is a disconnection on the vehicle side, specifically a disconnection of the lead 71A that interconnects point A and the ECU 72 and/or a disconnection of the lead 71B that interconnects point B and the ECU 72 (a disconnection on the vehicle side), the electrical resistance between point A and point B becomes ∞ as shown in Table 1. Based on this, the occupant 27 can be notified of an abnormality with the vehicle 12.

In this way, according to the present embodiment, in a configuration where the buckle 18 is provided with the force limiter 22 but is not provided with a pretensioner, use of the webbing 14 after activation of the force limiter 22 can be prevented at a low cost. Specifically, the occupant 27 can be prompted to fasten the webbing 14 in normal times when the force limiter 22 has not yet been activated, and use of the webbing 14 after activation of the force limiter 22 can be prevented. Furthermore, the occupant 27 can distinguish between the abnormality that the webbing 14 is not fastened and the abnormality that the force limiter 22 has been activated.

Second Embodiment

Figure 6:
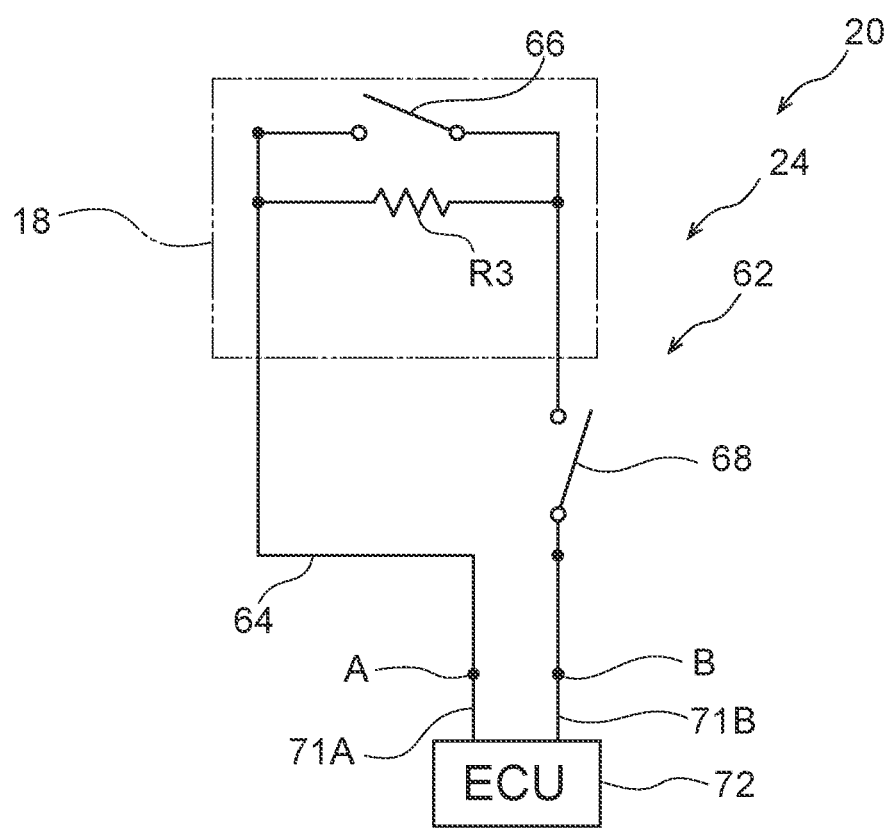
FIG. 6 is a circuit diagram showing the electrical circuit of the warning section in a vehicle seat belt system pertaining to a second embodiment.

In FIG. 6, in a vehicle seat belt system 20 pertaining to the present embodiment, the configuration of the electrical circuit 62 in the warning section 24 is different from what it is in the first embodiment. Parts identical to those in the first embodiment are assigned identical reference signs in FIG. 6, and description of those parts will be omitted.

The electrical circuit 62 has the circuit 64, the buckle switch 66, the movement detection switch 68, and a resistor R3. The resistor R3 is provided in parallel with the buckle switch 66 in the circuit 64. The electrical resistance of the resistor R3 is, for example, 1 Ω.

(Action)

The present embodiment is configured as described above, and the action thereof will be described below. In FIG. 1, FIG. 2, FIG. 6, and Table 2, when the force limiter 22 has not yet been activated and the buckle 18 is not moving, the movement detection switch 68 is ON.

TABLE 2

| State of Webbing | Electrical Resistance Ω between Point A and Point B | Type of Warning |
|---|---|---|
| Force Limiter Not Yet Activated | Fastened | 1 | None |
| | Not Fastened | 0 | Webbing Not Fastened |

TABLE 2-continued

| | State of Webbing | Electrical Resistance Ω between Point A and Point B | Type of Warning |
|---|---|---|---|
| Force Limiter Has Been Activated | Fastened | ∞ | Webbing Unusable |
| | Not Fastened | ∞ | Webbing Unusable |
| Disconnection on Vehicle Side | | ∞ | Webbing Unusable |

In this state, the electrical resistance between point A and point B becomes 0 when the buckle switch 66 is ON and becomes 1 Ω, which is the resistance value of the resistor R3, when the buckle switch 66 is OFF. Because of this difference in electrical resistance, whether or not the tongue plate 34 is engaged with the buckle 18 can be discriminated. When the buckle 18 and the tongue plate 34 are not engaged with each other, the warning section 24 notifies the occupant 27 of the abnormality that the occupant 27 has not fastened the webbing 14. The means for notifying the occupant 27 of the abnormality is the same as in the first embodiment. It will be noted that whether to give the buckle switch 66 an ON setting or an OFF setting when the buckle 18 and the tongue plate 34 are engaged with each other is arbitrary.

When the force limiter 22 has been activated and the buckle 18 is moving, the movement detection switch 68 switches OFF. The resistor R3 is provided in parallel with the buckle switch 66, and the buckle switch 66 is provided in series with the movement detection switch 68, so when the movement detection switch 68 switches OFF, the path between point A and point B becomes no longer conductive and the electrical resistance between point A and point B becomes ∞. Namely, whether or not the force limiter 22 has been activated can be discriminated depending on whether or not the electrical resistance between point A and point B is ∞. When the force limiter 22 has been activated, the warning section 24 notifies the occupant 27 of that abnormality (the webbing 14 is unusable).

In addition, in a case where there is a disconnection on the vehicle side, specifically a disconnection of the lead 71A that interconnects point A and the ECU 72 and/or a disconnection of the lead 71B that interconnects point B and the ECU 72 (a disconnection on the vehicle side), the electrical resistance between point A and point B becomes ∞ as shown in Table 2. Based on this, the occupant 27 can be notified of an abnormality with the vehicle 12 (the webbing 14 is unusable). The electrical resistance between point A and point B becomes ∞ in both a case where the force limiter 22 has been activated and a case where there is a disconnection on the vehicle side. The occupant 27 is notified of an abnormality without these being distinguished, so it is difficult for the occupant 27 to discriminate the type of abnormality. Even so, the occupant 27 can be made aware of an abnormality by the warning, so that the occupant 27 can be prompted to take the vehicle 12 in to a car dealership or the like.

The present embodiment is suitable in a case where the output of an airbag (not shown in the drawings) is controlled depending on whether or not the webbing is fastened.

Third Embodiment

Figure 7:
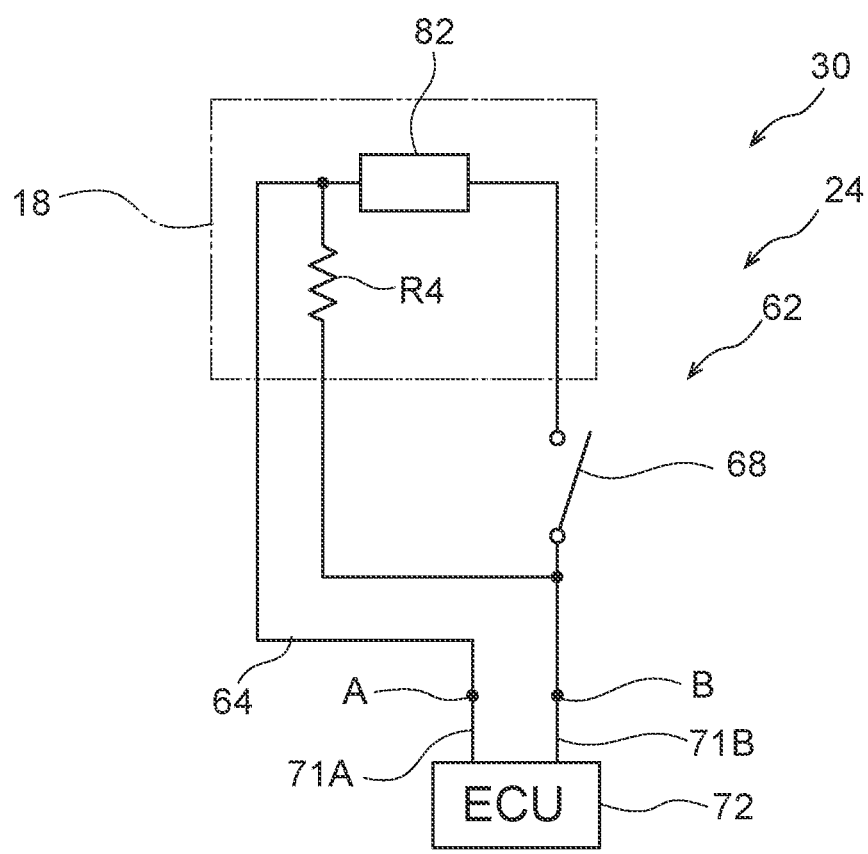
FIG. 7 is a circuit diagram showing the electrical circuit of the warning section in a vehicle seat belt system pertaining to a third embodiment.

In FIG. 7, in a vehicle seat belt system 30 pertaining to the present embodiment, the configuration of the electrical circuit 62 in the warning section 24 is different from what it is in the first embodiment. Parts identical to those in the first embodiment are assigned identical reference signs in FIG. 7, and description of those parts will be omitted.

The electrical circuit 62 has the circuit 64, a Hall switch 82, the movement detection switch 68, and a resistor R4. The Hall switch 82 is a contactless sensor provided in the circuit 64 and whose resistance value changes depending on whether or not the tongue plate 34 is engaged with the buckle 18. The electrical resistance of the Hall switch 82 is, for example, 10 to 15 Ω when the webbing 14 is fastened and 2 to 4 Ω when the webbing 14 is not fastened.

The resistor R4 is provided in parallel with the Hall switch 82 and the movement detection switch 68 in the circuit 64. The electrical resistance of the resistor R4 is, for example, 100 Ω in contrast to the range of the resistance value of the Hall switch 82.

(Action)

The present embodiment is configured as described above, and the action thereof will be described below. In FIG. 1, FIG. 2, FIG. 7, and Table 3, when the force limiter 22 has not yet been activated and the buckle 18 is not moving, the movement detection switch 68 is ON.

TABLE 3

| | State of Webbing | Electrical Resistance Ω between Point A and Point B | Type of Warning |
|---|---|---|---|
| Force Limiter Not Yet Activated | Fastened | 5.7 to 9.1 | None |
| | Not Fastened | 1.1 to 1.5 | Webbing Not Fastened |
| Force Limiter Has Been Activated | Fastened | 100 | Webbing Unusable |
| | Not Fastened | 100 | Webbing Unusable |
| Disconnection on Vehicle Side | | ∞ | Vehicle Abnormality |

In this state, the electrical resistance between point A and point B is a value in which the resistance value of the Hall switch 82 and the resistance value of the resistor R4 are combined in parallel. The resistance value of the Hall switch 82 changes depending on whether or not the tongue plate 34 is engaged with the buckle 18 (whether the webbing 14 is fastened or not fastened). Consequently, the combined resistance value becomes 5.7 to 9.1 Ω when the webbing 14 is fastened and becomes 1.1 to 1.5 Ω when the webbing 14 is not fastened. Because of this difference in electrical resistance between point A and point B, whether or not the tongue plate 34 is engaged with the buckle 18 can be discriminated. When the buckle 18 and the tongue plate 34 are not engaged with each other, the warning section 24 notifies the occupant 27 of the abnormality that the webbing 14 is not fastened.

When the force limiter 22 has been activated and the buckle 18 is moving, the movement detection switch 68 switches OFF. At this time, the conduction path between point A and point B includes just the resistor R4. The Hall switch 82 is provided in series with the movement detection switch 68, so when the movement detection switch 68 switches OFF, the conduction path between point A and point B no longer includes the Hall switch 82. Consequently, the electrical resistance between point A and point B becomes 100 Ω, which is the resistance value of the resistor R4, regardless of the resistance value of the Hall switch 82. Namely, whether or not the force limiter 22 has been activated can be discriminated depending on whether or not the electrical resistance between point A and point B is the resistance value of the resistor R4. When the force limiter 22 has been activated, the warning section 24 notifies the occupant 27 of that abnormality (the webbing 14 is unusable).

In addition, in a case where there is a disconnection on the vehicle side, specifically a disconnection of the lead 71A that interconnects point A and the ECU 72 and/or a disconnection of the lead 71B that interconnects point B and the ECU 72, the electrical resistance between point A and point B becomes ∞ as shown in Table 3. Based on this, the occupant 27 can be notified of an abnormality with the vehicle 12

The present embodiment is suitable in a case where the output of an airbag (not shown in the drawings) is controlled depending on whether or not the webbing 14 is fastened.

Fourth Embodiment

Figure 8:
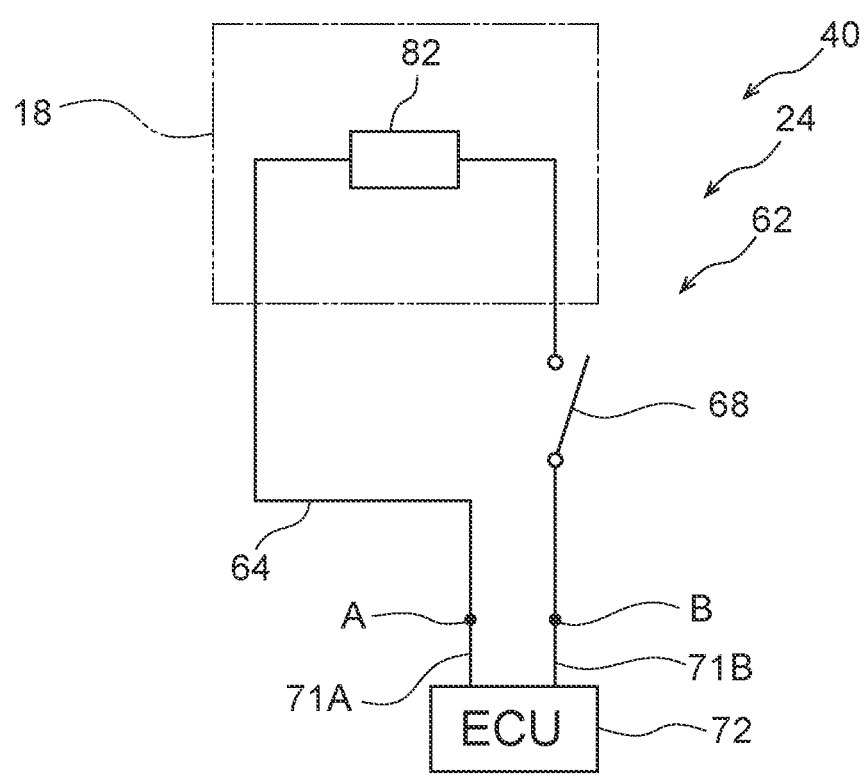
FIG. 8 is a circuit diagram showing the electrical circuit of the warning section in a vehicle seat belt system pertaining to a fourth embodiment.

In FIG. 8, in a vehicle seat belt system 40 pertaining to the present embodiment, the configuration of the electrical circuit 62 in the warning section 24 is different from what it is in the first embodiment and the third embodiment. Parts identical to those in the first embodiment and the third embodiment are assigned identical reference signs in FIG. 8, and description of those parts will be omitted.

The electrical circuit 62 has the circuit 64, the same Hall switch 82 as in the third embodiment, and the movement detection switch 68. In contrast to the third embodiment, a resistor is not used in the electrical circuit 62.

(Action)

The present embodiment is configured as described above, and the action thereof will be described below. In FIG. 1, FIG. 2, FIG. 8, and Table 4, when the force limiter 22 has not yet been activated and the buckle 18 is not moving, the movement detection switch 68 switches ON.

TABLE 4

| State of Webbing | Electrical Resistance Ω between Point A and Point B | Type of Warning |
|---|---|---|
| Force Limiter Not Yet Activated | Fastened | 10 to 15 | None |
| | Not Fastened | 2 to 4 | Webbing Not Fastened |
| Force Limiter Has Been Activated | Fastened | ∞ | Webbing Unusable |
| | Not Fastened | ∞ | Webbing Unusable |
| Disconnection on Vehicle Side | | ∞ | Webbing Unusable |

In this state, the electrical resistance between point A and point B becomes the resistance value of the Hall switch 82. The resistance value of the Hall switch 82 changes depending on whether or not the tongue plate 34 is engaged with the buckle 18 (whether the webbing 14 is fastened or not fastened). Specifically, the resistance value of the Hall switch 82 is 10 to 15 Ω when the webbing 14 is fastened and is 2 to 4 Ω when the webbing 14 is not fastened. Consequently, because of this difference in electrical resistance, whether or not the tongue plate 34 is engaged with the buckle 18 can be discriminated. When the buckle 18 and the tongue plate 34 are not engaged with each other, the warning section 24 notifies the occupant 27 of the abnormality that the webbing 14 is not fastened.

When the force limiter 22 has been activated and the buckle 18 is moving, the movement detection switch 68 switches OFF. The Hall switch 82 is provided in series with the movement detection switch 68, so when the movement detection switch 68 switches OFF, the path between point A and point B becomes no longer conductive and the electrical resistance between point A and point B becomes ∞. Namely, whether or not the force limiter 22 has been activated can be discriminated depending on whether or not the electrical resistance between point A and point B is ∞. When the force limiter 22 has been activated, the warning section 24 notifies the occupant 27 of that abnormality (the webbing 14 is unusable).

In addition, in a case where there is a disconnection on the vehicle side, specifically a disconnection of the lead 71A that interconnects point A and the ECU 72 and/or a disconnection of the lead 71B that interconnects point B and the ECU 72, the electrical resistance between point A and point B becomes ∞ as shown in Table 4. Based on this, the occupant 27 can be notified of an abnormality with the vehicle 12 (the webbing 14 is unusable). The electrical resistance between point A and point B becomes ∞ in both a case where the force limiter 22 has been activated and a case where there is a disconnection on the vehicle side. The occupant 27 is notified of an abnormality without these being distinguished, so it is difficult for the occupant 27 to discriminate the type of abnormality. Even so, the occupant 27 can be made aware of an abnormality by the warning, so that the occupant 27 can be prompted to take the vehicle 12 in to a car dealership or the like.

Fifth Embodiment

Figure 9:
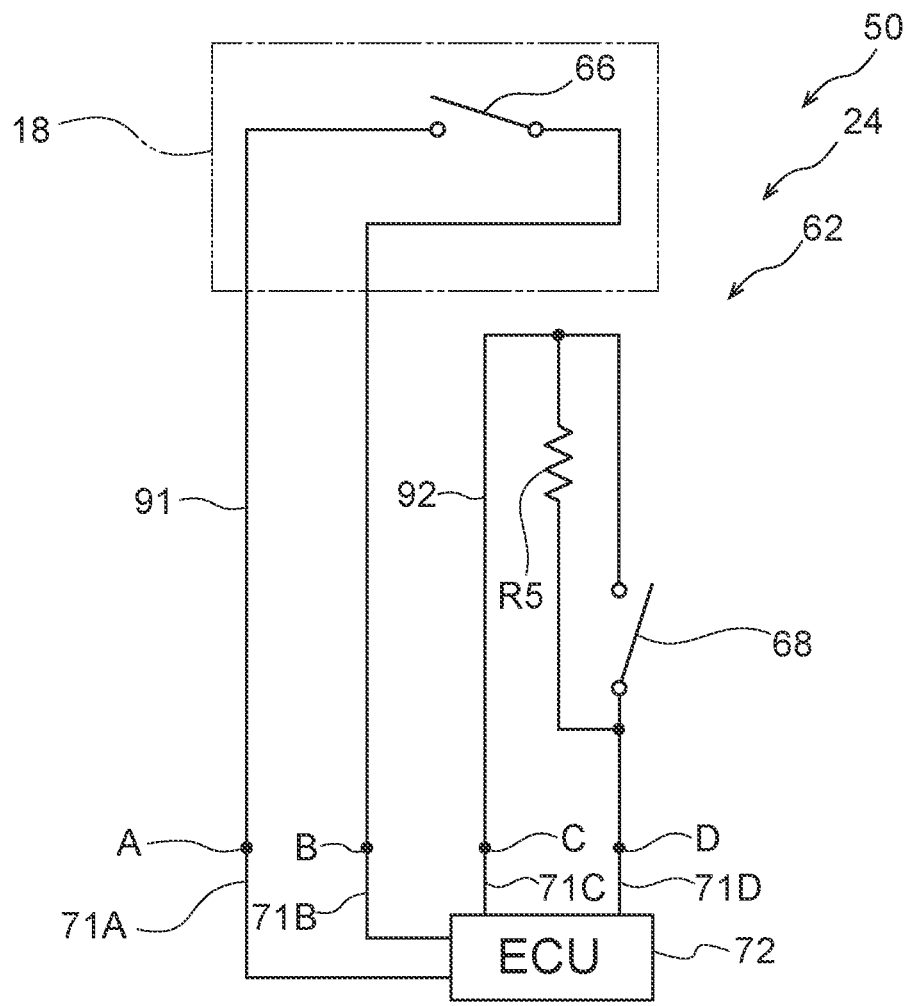
FIG. 9 is a circuit diagram showing the electrical circuit of the warning section in a vehicle seat belt system pertaining to a fifth embodiment.

In FIG. 9, in a vehicle seat belt system 50 pertaining to the present embodiment, the configuration of the electrical circuit 62 in the warning section 24 is different from what it is in the first embodiment. Parts identical to those in the first embodiment are assigned identical reference signs in FIG. 9, and description of those parts will be omitted.

The electrical circuit 62 has a first circuit 91, the buckle switch 66, a second circuit 92, the movement detection switch 68, and a resistor R5.

The first circuit 91 interconnects point A and point B, which are measurement points of the electrical resistance. The ECU 72 is connected via the leads 71A and 71B to point A and point B. The buckle switch 66 is provided in the first circuit 91. The electrical resistance between point A and point B becomes 0 when the buckle switch 66 is ON and becomes ∞ when the buckle switch 66 is OFF. In the present embodiment, it is determined that the buckle 18 and the tongue plate 34 are engaged with each other when the buckle switch 66 is ON, and it is determined that the buckle 18 and the tongue plate 34 are not engaged with each other when the buckle switch 66 is OFF.

The second circuit 92 interconnects point C and point D that measure the electrical resistance separately from the first circuit 91. The ECU 72 is connected via leads 71C and 71D to point C and point D. The movement detection switch 68 is provided in the second circuit 92. The resistor R5 is provided in parallel with the movement detection switch 68 in the second circuit 92. The electrical resistance of the resistor R5 is, for example, 2 Ω.

(Action)

The present embodiment is configured as described above, and the action thereof will be described below. In FIG. 1, FIG. 2, FIG. 9, and Table 5, in the present embodiment, whether or not the tongue plate 34 is engaged with the buckle 18 is discriminated with the first circuit 91, and whether or not the force limiter 22 has been activated is discriminated with the second circuit 92.

TABLE 5

| State of Webbing | | Electrical Resistance Ω | | Type of Warning |
|---|---|---|---|---|
| | | Between Point A and Point B | Between Point C and Point D | |
| Force Limiter Not Yet Activated | Fastened | 0 | 0 | None |
| | Not Fastened | ∞ | 0 | Webbing Not Fastened |
| Force Limiter Has Been Activated | Fastened | 0 | 2 | Webbing Unusable |
| | Not Fastened | ∞ | 2 | Webbing Not Fastened and Webbing Unusable |
| Disconnection on Vehicle Side | | ∞ | ∞ | Vehicle Abnormality |

The buckle switch 66 is provided in the first circuit 91 that interconnects point A and point B, and the electrical resistance between point A and point B becomes 0 when the buckle switch 66 is ON and becomes ∞ when the buckle switch 66 is OFF. Because of this difference in electrical resistance, whether or not the tongue plate 34 is engaged with the buckle 18 can be discriminated. When the electrical resistance between point A and point B is ∞ and the buckle 18 and the tongue plate 34 are not engaged with each other, the warning section 24 notifies the occupant 27 of the abnormality that the occupant 27 has not fastened the webbing 14.

When the force limiter 22 has not yet been activated, the movement detection switch 68 provided in the second circuit 92 that interconnects point C and point D is ON and the electrical resistance between point C and point D becomes 0. When the force limiter 22 has been activated and the buckle 18 is moving, the movement detection switch 68 switches OFF. At this time, the conduction path between point C and point D includes just the resistor R5. Consequently, the electrical resistance between point C and point D becomes the resistance value of the resistor R5. Namely, whether or not the force limiter 22 has been activated can be discriminated depending on whether the electrical resistance between point C and point D is 0 or the resistance value (2 Ω) of the resistor R5. When the force limiter 22 has been activated, the warning section 24 notifies the occupant 27 of the abnormality (the webbing 14 is unusable).

In addition, in a case where there is a disconnection on the vehicle side, specifically a disconnection of the lead 71C that interconnects point C and the ECU 72 and/or a disconnection of the lead 71D that interconnects point D and the ECU 72, the electrical resistance between point C and point D becomes ∞ as shown in Table 5. Based on this, the occupant 27 can be notified of an abnormality with the vehicle 12.

If at least one of the leads 71A and 71B is disconnected, the electrical resistance between point A and point B becomes ∞ regardless of whether or not the webbing 14 is fastened. Namely, even if the webbing 14 is fastened, the occupant 27 is still notified of the abnormality that the webbing 14 is not fastened. For example, a seat belt warning light is still lighted up or a seat belt warning sound is still sounded. Because of this, the occupant 27 can become aware of the occurrence of an abnormality.

Sixth Embodiment

Figure 10A:
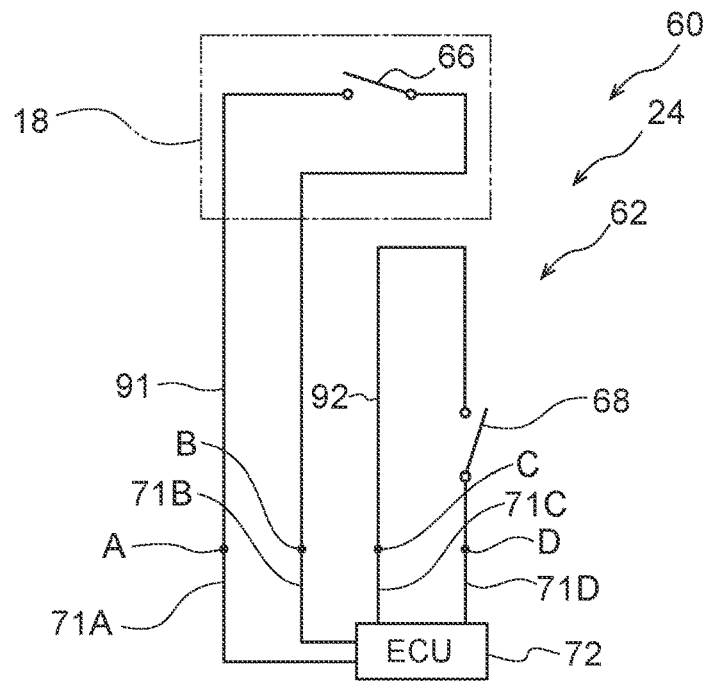
FIG. 10A is a circuit diagram showing one example of the electrical circuit of the warning section in a vehicle seat belt system pertaining to a sixth embodiment.
Figure 10B:
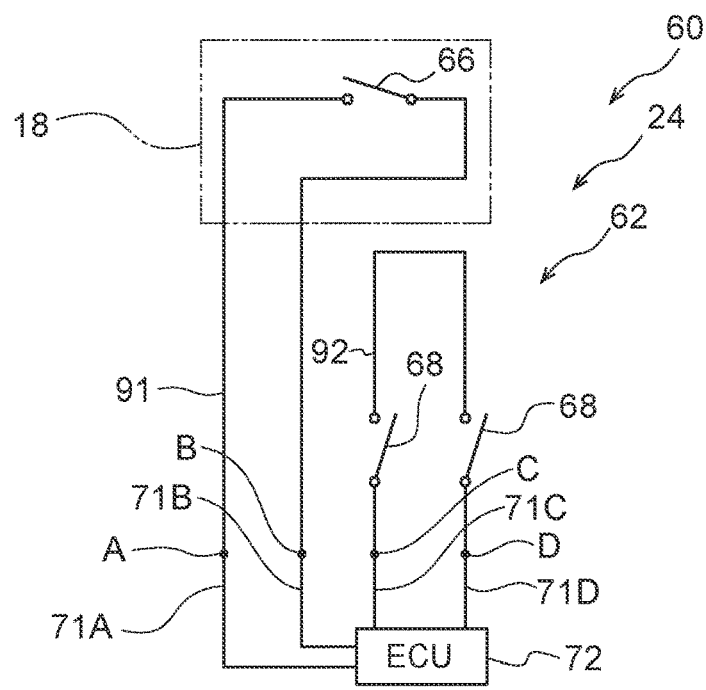
FIG. 10B is a circuit diagram showing another example of the electrical circuit of the warning section in the vehicle seat belt system pertaining to the sixth embodiment.

In FIG. 10A and FIG. 10B, in a vehicle seat belt system 60 pertaining to the present embodiment, the configuration of the electrical circuit 62 in the warning section 24 is different from what it is in the first embodiment and the fifth embodiment. Parts identical to those in the first embodiment and the fifth embodiment are assigned identical reference signs in FIG. 10A and FIG. 10B, and description of those parts will be omitted.

The electrical circuit 62 has the first circuit 91, the buckle switch 66, the second circuit 92, and the movement detection switch 68. In contrast to the fifth embodiment, a resistor is not used in the electrical circuit 62.

In the example shown in FIG. 10A, one movement detection switch 68 is provided in the second circuit 92. This is a structure where the buckle 18 side and the ECU 72 side are connected by a lead even after the buckle 18 has moved because of the force limiter 22. In contrast, in the example shown in FIG. 10B, two movement detection switches 68 are provided in the second circuit 92. The structure in FIG. 10A and the structure in FIG. 10B are circuits electrically equivalent to each other, but in the structure in FIG. 10B, the buckle 18 side and the ECU 72 side become completely cut off from each other, without being connected to each other by a lead, after the buckle 18 has moved because of the force limiter 22.

(Action)

The present embodiment is configured as described above, and the action thereof will be described below. In FIG. 1, FIG. 2, FIG. 10A, FIG. 10B, and Table 6, in the vehicle seat belt system 60 pertaining to the present embodiment, whether or not the tongue plate 34 is engaged with the buckle 18 is discriminated with the first circuit 91, and whether or not the force limiter 22 has been activated is discriminated with the second circuit 92.

TABLE 6

| State of Webbing | | Electrical Resistance Ω | | Type of Warning |
|---|---|---|---|---|
| | | Between Point A and Point B | Between Point C and Point D | |
| Force Limiter Not Yet Activated | Fastened | 0 | 0 | None |
| | Not Fastened | ∞ | 0 | Webbing Not Fastened |
| Force Limiter Has Been Activated | Fastened | 0 | ∞ | Webbing Unusable |
| | Not Fastened | ∞ | ∞ | Webbing Not Fastened and Webbing Unusable |
| Disconnection on Vehicle Side | | ∞ | ∞ | Webbing Unusable |

The buckle switch 66 is provided in the first circuit 91 that interconnects point A and point B, and the electrical resistance between point A and point B becomes 0 when the buckle switch 66 is ON and becomes ∞ when the buckle switch 66 is OFF. Because of this difference in electrical resistance, whether or not the tongue plate 34 is engaged with the buckle 18 can be discriminated. When the electrical resistance between point A and point B is ∞ and the buckle 18 and the tongue plate 34 are not engaged with each other, the warning section 24 notifies the occupant 27 of the abnormality that the occupant 27 has not fastened the webbing 14.

When the force limiter 22 has not yet been activated, the movement detection switch 68 provided in the second circuit 92 that interconnects point C and point D is ON and the electrical resistance between point C and point D becomes 0. When the force limiter 22 has been activated and the buckle 18 is moving, the movement detection switch 68 switches OFF and the electrical resistance between point C and point D becomes ∞. Namely, whether or not the force limiter 22 has been activated can be discriminated depending on whether the electrical resistance between point C and point D is 0 or ∞. When the force limiter 22 has been activated, the warning section 24 notifies the occupant 27 of that abnormality.

In addition, in a case where there is a disconnection on the vehicle side, specifically a disconnection of the lead 71C that interconnects point C and the ECU 72 and/or a disconnection of the lead 71D that interconnects point D and the ECU 72 (a disconnection on the vehicle side), the electrical resistance between point C and point D becomes ∞ as shown in Table 6. Based on this, the occupant 27 can be notified of an abnormality with the vehicle 12.

If at least one of the leads 71A and 71B is disconnected, the electrical resistance between point A and point B becomes ∞ regardless of whether or not the webbing 14 is fastened. Namely, even if the webbing 14 is fastened, the occupant 27 is still notified of the abnormality that the webbing 14 is not fastened. For example, a seat belt warning light is still lighted up or a seat belt warning sound is still sounded. Because of this, the occupant 27 can become aware of the occurrence of an abnormality.

Seventh Embodiment

Figure 11:
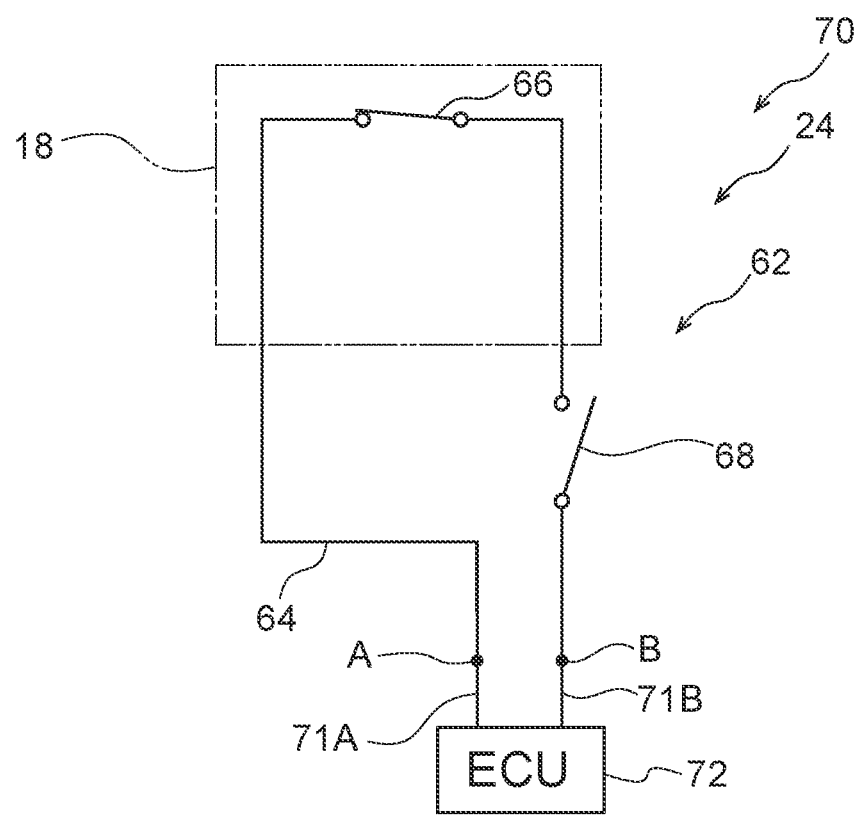
FIG. 11 is a circuit diagram showing the electrical circuit of the warning section in a vehicle seat belt system pertaining to a seventh embodiment.

In FIG. 11, in a vehicle seat belt system 70 pertaining to the present embodiment, the warning section 24 notifies the occupant 27 of, without distinguishing between, the abnormality when the buckle 18 and the tongue plate 34 are not engaged with each other and the abnormality when the force limiter 22 has been activated.

The electrical circuit 62 has the circuit 64, the buckle switch 66, and the movement detection switch 68. The movement detection switch 68 is provided in series with the buckle switch 66 in the circuit 64 and becomes disconnected due to the movement of the buckle 18. In contrast to the first embodiment and the second embodiment, a resistor is not used in the electrical circuit 62.

It will be noted that parts identical to those in the first embodiment are assigned identical reference signs in FIG. 11, and description of those parts will be omitted.

(Action)

The present embodiment is configured as described above, and the action thereof will be described below. In FIG. 1, FIG. 2, FIG. 11, and Table 7, in the present embodiment, the warning section 24 notifies the occupant 27 of, without distinguishing between, the abnormality when the buckle 18 and the tongue plate 34 are not engaged with each other and the abnormality when the force limiter 22 has been activated. And when the force limiter 22 has been activated, the warning section 24 likewise notifies the occupant 27 of the abnormality. Consequently, the occupant 27 can be notified of abnormalities at a low cost.

TABLE 7

| | State of Webbing | Electrical Resistance Ω between Point A and Point B | Type of Warning |
|---|---|---|---|
| Force Limiter Not Yet Activated | Fastened | 0 | None |
| | Not Fastened | ∞ | Abnormality |
| Force Limiter Has Been Activated | Fastened | ∞ | Abnormality |
| | Not Fastened | ∞ | Abnormality |
| Disconnection on Vehicle Side | | ∞ | Abnormality |

Specifically, in the electrical circuit 62, the buckle switch 66 and the movement detection switch 68 are provided in series between point A and point B. Consequently, the electrical resistance between point A and point B becomes 0 when both switches are ON and becomes ∞ when at least one of the switches is OFF. When the electrical resistance between point A and point B is ∞, the warning section 24 notifies the occupant 27 of the abnormality.

In addition, in a case where there is a disconnection on the vehicle side, specifically a disconnection of the lead 71A that interconnects point A and the ECU 72 and/or a disconnection of the lead 71B that interconnects point B and the ECU 72, the electrical resistance between point A and point B becomes ∞ as shown in Table 7. Based on this, the occupant 27 can be notified of an abnormality with the vehicle 12 (the webbing 14 is unusable). The electrical resistance between point A and point B becomes ∞ in any of a case where the force limiter 22 has not yet been activated and the webbing 14 is not fastened, a case where the force limiter 22 has been activated, and a case where there is a disconnection on the vehicle side. The occupant 27 is notified of the abnormality without these being distinguished, so it is difficult for the occupant 27 to discriminate the type of abnormality. Even so, the occupant 27 can be made aware of the abnormality by the warning, so that the occupant 27 can be prompted to take the vehicle 12 in to a car dealership or the like.

Eighth Embodiment

In FIG. 12A and FIG. 12B, a vehicle seat belt system 80 pertaining to the present embodiment has a cover member 86 that overlaps the side portion of the buckle 18. The cover member 86, together with the bracket 44, is provided, in such a way as to be swingable in the vehicle front and rear direction via the support shaft 48, on the seat frame 46 on the vehicle width direction inner side of the vehicle seat 26. Furthermore, an indicator 88 that indicates that the force limiter 22 has been activated is provided as the warning section 24 on the side portion of the buckle 18.

The indicator 88 is hidden by the cover member 86 when the force limiter 22 has not yet been activated (FIG. 12A) and appears due to the movement of the buckle 18 relative to the cover member 86 (FIG. 12B). The indicator 88 may be provided as a band around the entire side portion of the buckle 18. The color and pattern of the indicator 88 are arbitrary, but red may be used because it has the meaning of warning. Furthermore, text such as "unusable" may also be used as the indicator 88.

Other parts are the same as those in the first embodiment, so identical parts are assigned identical reference signs in FIG. 12A and FIG. 12B, and description of those parts will be omitted.

(Action)

The present embodiment is configured as described above, and the action thereof will be described below. In FIG. 12A, in the vehicle seat belt system 80 pertaining to the present embodiment, when the force limiter 22 has not yet been activated, the indicator 88 that indicates that the force limiter 22 has been activated is hidden by the cover member 86 of the buckle 18. When the buckle 18 moves relative to the cover member 86 due to activation of the force limiter 22, the indicator 88 that indicates that the force limiter 22 has been activated appears as shown in FIG. 12B. Because of this, the occupant 27 or another occupant of the vehicle 12 can be made aware of an abnormality, and the need to service the vehicle 12 can be relayed. In this way, use of the webbing 14 after activation of the force limiter 22 can be prevented easily and with a configuration that the occupant 27 or someone else can see.

Ninth Embodiment

Figure 13A:
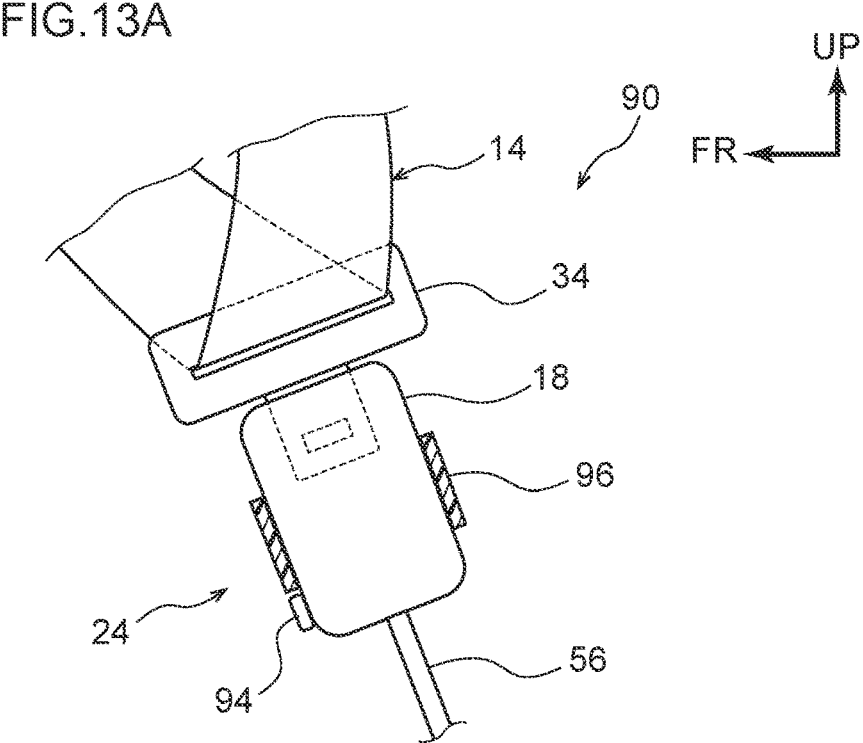
FIG. 13A is a perspective view showing the state of the buckle before activation of the force limiter in a vehicle seat belt system pertaining to a ninth embodiment.

In FIG. 13A, a vehicle seat belt system 90 pertaining to the present embodiment has a cover member 96 that overlaps the side portion of the buckle 18. The cover member 96 is formed shorter than the total length of the buckle 18. Before activation of the force limiter 22 (FIG. 2), the cover member 96 overlaps the longitudinal direction central portion of the buckle 18.

In the present embodiment, a capsule 94 that ruptures due to the movement of the buckle 18 relative to the cover member 96 and produces a gas 98 (FIG. 13B) that the occupant 27 can sense is provided as the warning section 24. The capsule 94 is secured to the lower end portion of the vehicle front side of the buckle 18, for example, and is positioned on the vehicle lower side of the cover 96. The gas 98 may be smoky so as to be visible or may include an odor that the occupant 27 (FIG. 1) can sense by smell.

Figure 13B:
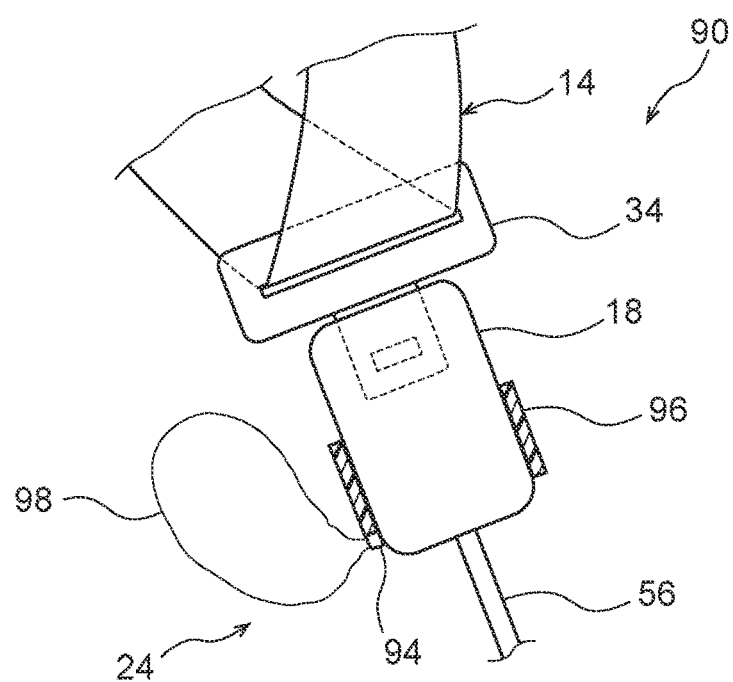
FIG. 13B is a perspective view showing a state in which a capsule has burst and warning gas has been produced after activation of the force limiter.

Other parts are the same as those in the first embodiment, so identical parts are assigned identical reference numerals in FIG. 13A and FIG. 13B, and description of those parts will be omitted.

(Action)

The present embodiment is configured as described above, and the action thereof will be described below. In FIG. 13B, in the present embodiment, when the buckle 18 moves relative to the cover member 96 due to activation of the force limiter 22 (FIG. 2), the capsule 94 bursts and the gas 98 that the occupant 27 can sense is produced. The occupant 27 can detect an abnormality by sensing the gas 98. In this way, according to the present embodiment, use of the webbing 14 after activation of the force limiter 22 can be prevented easily and with a configuration that the occupant 27 can sense.

Tenth Embodiment

Although it is not shown in the drawings, in a vehicle seat belt system pertaining to the present embodiment, the warning section 24 has a configuration that increases the load needed for the tongue plate 34 to engage with the buckle 18 due to the movement of the buckle 18 resulting from the force limiter 22. Usually, the part inside the buckle 18 that engages with the tongue plate 34 is urged by a spring (not shown in the drawings). Thus, pre-compression with respect to the spring may be increased when the buckle 18 moves.

In the present embodiment, when the buckle 18 moves because of the force limiter 22, the load needed for the tongue plate 34 to engage with the buckle 18 increases. Consequently, when thereafter the occupant 27 tries to cause the tongue plate 34 to engage with the buckle 18, the occupant 27 feels a stronger resistance than usual. The occupant 27 can detect an abnormality by feeling the change in the resistance. According to the present embodiment, use of the webbing 14 after activation of the force limiter 22 can be prevented with a configuration that imparts to the occupant 27 a feeling that something is wrong.

Other Embodiments

Examples of embodiments of the disclosure have been described above, but the embodiments of the disclosure are not limited what is described above and can naturally be modified and implemented in a variety of ways, in addition to what is described above, in a range that does not depart from the spirit thereof.

The above embodiments can also be appropriately combined with each other and used.

What is claimed is:

1. A vehicle seat belt system comprising:
   webbing that has one end anchored to one seat width direction side surface of a vehicle seat or to a vehicle body, and that restrains an occupant seated in the vehicle seat;
   a retractor to which another end of the webbing is engaged and that is configured to take up the webbing, the retractor being provided with a pretensioner which, when activated, pulls in the webbing;
   a buckle, that is provided on another seat width direction side surface of the vehicle seat or on the vehicle body, with which a tongue plate attached to the webbing can be engaged;
   a force limiter that allows the buckle to move to thereby reduce a tensile load acting on the webbing due to activation of the pretensioner; and
   a warning section that is configured to utilize movement of the buckle resulting from the force limiter to notify the occupant of an abnormality that the force limiter has been activated,
   wherein the warning section is configured to electrically detect movement of the buckle and electrically notify the occupant of the abnormality, and
   wherein the warning section includes an electrical circuit and is configured such that electrical resistance in the electrical circuit changes when part of the electrical circuit becomes disconnected due to movement of the buckle, and the warning section determines, in accordance with the electrical resistance, whether or not the force limiter has been activated.

2. The vehicle seat belt system according to claim 1, wherein the warning section is configured to notify the occupant of a second abnormality when the buckle and the tongue plate are not engaged with each other and notify the occupant of the abnormality, regardless of whether or not the buckle and the tongue plate are engaged with each other, when the force limiter has been activated.

3. The vehicle seat belt system according to claim 2, wherein the warning section is configured to distinguish between, and notify the occupant of, the second abnormality when the buckle and the tongue plate are not engaged with each other, and the abnormality when the force limiter has been activated.

4. The vehicle seat belt system according to claim 3, wherein the electrical circuit includes:
   a circuit that interconnects point A and point B, which are measurement points of the electrical resistance;
   a buckle switch that is provided in the circuit and switches ON and OFF depending on whether or not the tongue plate is engaged with the buckle;
   a movement detection switch that is provided in series with the buckle switch in the circuit and switches from ON to OFF due to movement of the buckle; and
   a resistor that is provided in parallel with the buckle switch in the circuit.

5. The vehicle seat belt system according to claim 3, wherein the electrical circuit includes:
   a circuit that interconnects point A and point B, which are measurement points of the electrical resistance;
   a buckle switch that is provided in the circuit and switches ON and OFF depending on whether or not the tongue plate is engaged with the buckle;
   a movement detection switch that is provided in series with the buckle switch in the circuit and switches from ON to OFF due to movement of the buckle;
   a first resistor that is provided in parallel with the buckle switch in the circuit; and
   a second resistor that is provided in parallel with the buckle switch and the movement detection switch in the circuit and that has a resistance value different from that of the first resistor.

6. The vehicle seat belt system according to claim 3, wherein the electrical circuit includes:
- a circuit that interconnects point A and point B, which are measurement points of the electrical resistance;
- a Hall switch that is provided in the circuit, a resistance value of the Hall switch changing depending on whether or not the tongue plate is engaged with the buckle; and
- a movement detection switch that is provided in series with the Hall switch in the circuit and becomes disconnected due to movement of the buckle.

7. The vehicle seat belt system according to claim 3, wherein the electrical circuit includes:
- a circuit that interconnects point A and point B, which are measurement points of the electrical resistance;
- a Hall switch that is provided in the circuit, a resistance value of the Hall switch changing depending on whether or not the tongue plate is engaged with the buckle;
- a movement detection switch that is provided in series with the Hall switch in the circuit and becomes disconnected due to movement of the buckle; and
- a resistor that is provided in parallel with the Hall switch and the movement detection switch in the circuit and that has a resistance value different from that of the Hall switch.

8. The vehicle seat belt system according to claim 3, wherein the electrical circuit includes:
- a first circuit that interconnects point A and point B, which are measurement points of the electrical resistance;
- a buckle switch that is provided in the first circuit and switches ON and OFF depending on whether or not the tongue plate is engaged with the buckle;
- a second circuit that is provided separately from the first circuit and interconnects point C and point D, which are measurement points of the electrical resistance; and
- a movement detection switch that is provided in the second circuit and becomes disconnected due to movement of the buckle.

9. The vehicle seat belt system according to claim 3, wherein the electrical circuit includes:
- a first circuit that interconnects point A and point B, which are measurement points of the electrical resistance;
- a buckle switch that is provided in the first circuit and switches ON and OFF depending on whether or not the tongue plate is engaged with the buckle;
- a second circuit that interconnects point C and point D that measure the electrical resistance separately from the first circuit;
- a movement detection switch that is provided in the second circuit and becomes disconnected due to movement of the buckle; and
- a resistor that is provided in parallel with the movement detection switch in the second circuit.

10. The vehicle seat belt system according to claim 2, wherein the warning section is configured to notify the occupant of, without distinguishing between, the second abnormality when the buckle and the tongue plate are not engaged with each other, and the abnormality when the force limiter has been activated.

11. The vehicle seat belt system according to claim 10, wherein the electrical circuit includes:
- a circuit that interconnects point A and point B, which are measurement points of the electrical resistance;
- a buckle switch that is provided in the circuit and detects whether or not the tongue plate is engaged with the buckle; and
- a movement detection switch that is provided in series with the buckle switch in the circuit and becomes disconnected due to movement of the buckle.

12. The vehicle seat belt system according to claim 1, wherein the electrical circuit includes an extra length portion that allows the buckle to move.

13. The vehicle seat belt system according to claim 1, further comprising a cover member that overlaps a side portion of the buckle, wherein an indicator that indicates that the force limiter has been activated is provided as the warning section in the side portion, and the indicator is hidden by the cover member when the force limiter has not yet been activated and appears due to movement of the buckle relative to the cover member.

14. The vehicle seat belt system according to claim 1, further comprising a cover member that overlaps a side portion of the buckle, wherein the vehicle seat belt system has, as the warning section, a capsule that bursts due to movement of the buckle relative to the cover member and produces a gas that the occupant can sense.

15. The vehicle seat belt system according to claim 1, wherein the warning section has a configuration that increases, due to movement of the buckle, a load needed for the tongue plate to engage with the buckle.

* * * * *